United States Patent [19]

Yamakawa et al.

[11] Patent Number: 5,515,179
[45] Date of Patent: May 7, 1996

[54] IMAGE PROCESSING OF ISOLATED PIXELS, AND METHOD, APPARATUS AND FACSIMILE INCORPORATING SUCH PROCESSING

[75] Inventors: Junichi Yamakawa; Yoshihiro Ishida, both of Kawasaki, Japan

[73] Assignee: Canon Kabushiki Kaisha, Tokyo, Japan

[21] Appl. No.: 171,176

[22] Filed: Dec. 22, 1993

[30] Foreign Application Priority Data

Dec. 28, 1992 [JP] Japan ................................ 4-361291

[51] Int. Cl.⁶ .................................................. H04N 1/40
[52] U.S. Cl. .......................... 358/447; 358/444; 358/467; 382/254; 382/266
[58] Field of Search ...................................... 358/447, 444, 358/448, 456, 459, 460, 464, 465, 466, 467, 451; 382/22, 50, 51, 254, 266, 256

[56] References Cited

U.S. PATENT DOCUMENTS

| | | | |
|---|---|---|---|
| 4,982,294 | 1/1991 | Morton et al. | 358/466 |
| 5,029,226 | 7/1991 | Klein et al. | 382/50 |
| 5,091,976 | 2/1992 | Murayama | 382/22 |

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

Outline vectors representing an arrangement of pixels of a binary image obtained by a binary image obtaining unit are extracted by an outline extractor. From the extracted outline vector, isolated points are extracted. These isolated points are stored in an isolated point data generator 7 as information indicative of the position of isolated point. The outline vectors other than the isolated points are stored in the vector generator 3 as vector data. When a binary image is reproduced, the stored position information of the isolated points is developed to produce vector data by the isolated point data developer 8. Accordingly, since the isolated points are stored not in the form of outline vectors, but position information, the storage capacity for storing the outline vectors can be small. This construction is effective in halftone image in particular.

60 Claims, 21 Drawing Sheets

EXAMPLE OF ROUGH OUTLINE VECTORS REPRESENTING AN IMAGE

IMAGE PROCESSING OF ISOLATED PIXELS, AND METHOD, APPARATUS AND FACSIMILE INCORPORATING SUCH PROCESSING

BACKGROUND OF THE INVENTION

The present invention relates to an image processing method and apparatus capable of executing image processing by using outline information of the image.

Conventional image processing apparatus is such that an outline of read image is extracted and the read image is stored as outline vectors representing the outline. In this apparatus, an outline vector is determined by a start point and an end point, that is, a single vector is determined by coordinates of two points.

However, in the conventional apparatus, since outline vector data is generated for each isolated point, a large capacity is required to store an image having many isolated points such as a pseudo-halftone image.

SUMMARY OF THE INVENTION

Accordingly, it is an object of the present invention to provide an image processing method and apparatus capable of storing outline vector data in a small storage capacity.

It is another object of the present invention to reduce a storage capacity required for recording by storing information indicative of the position of an extracted isolated point and generating an outline vector of the isolated point from the position information.

It is an aspect of the present invention to start an outline vector processing, without waiting until all outlines are extracted, by storing a part of an outline each time it is detected or extracted from an isolated point.

It is another aspect of the present invention to reduce the storage capacity required for recording by storing an outline vector as a difference between a vector of interest and its neighboring vector, and storing the isolated point at that position.

Furthermore, it is still another object of the present invention to provide a facsimile apparatus whose required storage memory for recording is reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

DESCRIPTION OF THE PREFERRED EMBODIMENTS

The preferred embodiments of the present invention will now be described in detail in accordance with the accompanying drawings.

[The First Embodiment]

Figure 1:
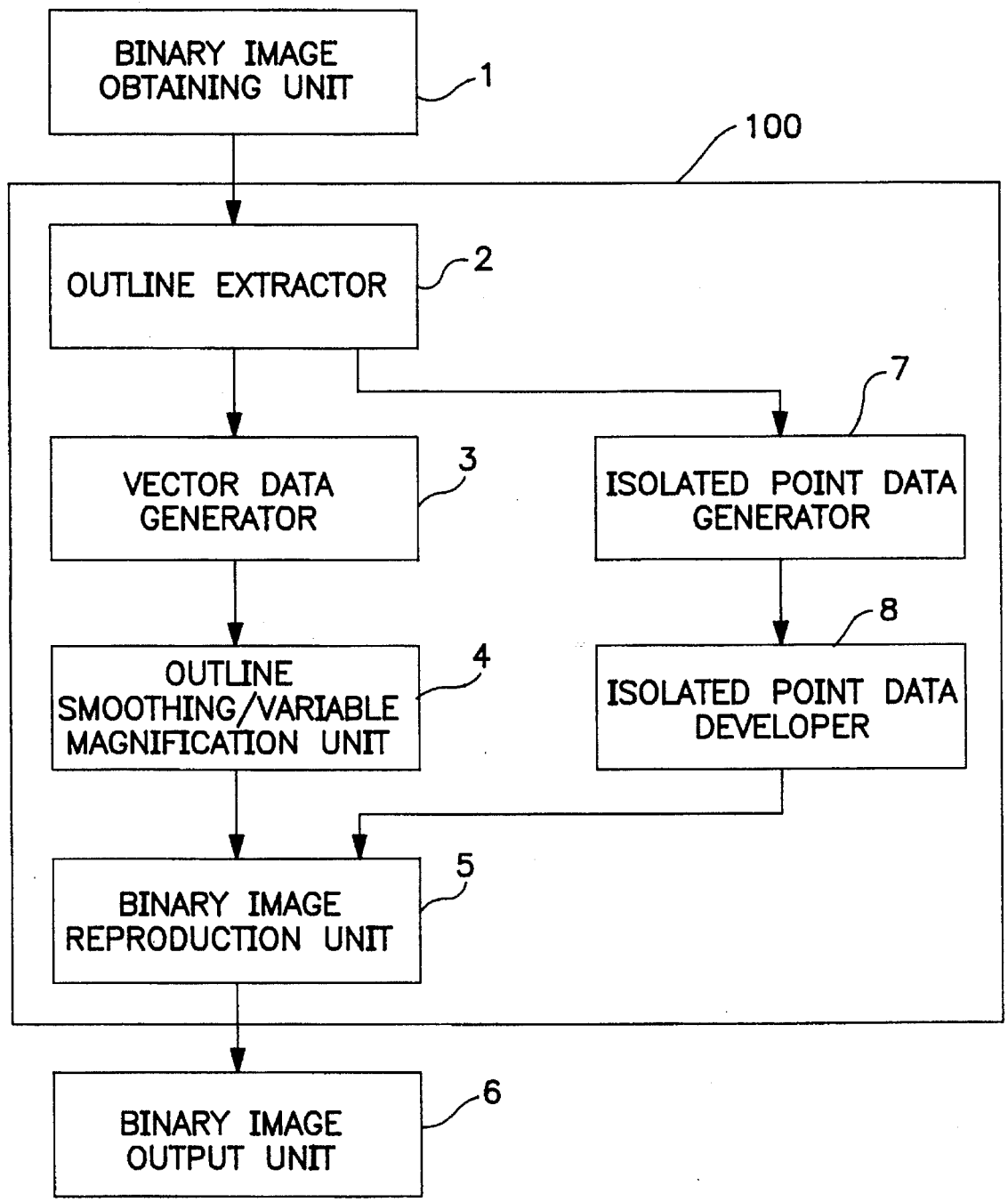
FIG. 1 is a block diagram illustrating the control structure of an image processing apparatus of the embodiment.

FIG. 1 is a block diagram illustrating the control structure of the image processing apparatus of the embodiment. In FIG. 1, a binary image obtaining unit 1 obtains digital binary image to be subject to a variable magnification processing and outputs a raster scanning type binary image signal. Outline extractor 2 extracts a rough outline vector which represents the outline (the outline vector before a smoothing/variable magnification processing is performed) from the binary image signal. Vector data generator 3 generates variable length data from the rough outline vector data represented by coordinate values with respect to the difference of the coordinate values. The outline smoothing/variable magnification unit 4 performs smoothing and variable magnification processing on the outline vector.

Subsequently, binary image reproduction unit 5 reproduces binary image from the outline vector data as raster scanning type binary image data. Binary image output unit 6 displays the binary image, prints a hard copy and outputs the binary image data to a communication path. Isolated point data generator 7 generates isolated point data with respect to any isolated point which is extracted by said outline extractor 2. Furthermore, an isolated point data developer 8 develops the isolated point data to produce coordinate value data (outline vector data).

The binary image obtaining unit 1, such as an image reader, is comprised of a well-known raster scanning type binary image output apparatus which reads and binarizes an image, and outputs the binary image in a raster scanning type. The outline extractor 2 receives a pixel of interest from the image in raster scanning order and detects a vector in the horizontal direction and vertical direction based on the pixel of interest and the neighboring pixel. The detected state of vector connection is used to extract an outline of the image. Note that an outline processor 100 comprises the outline extractor 2, vector data generator 3, outline smoothing/variable magnification unit 4, binary image reproducing unit 5, isolated point data generator 7 and isolated point data developer 8.

Figure 2B:
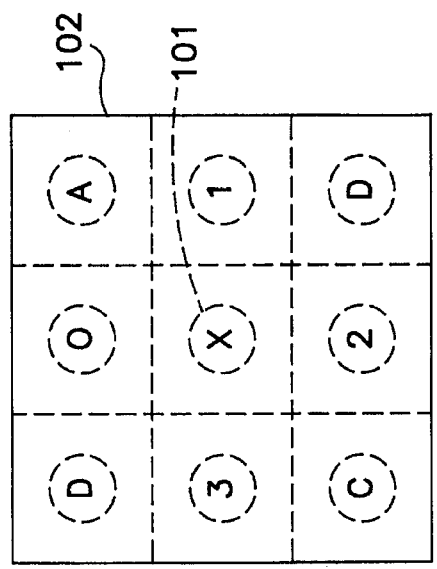
FIGS. 2A and 2B are diagrams for explaining how an outline is extracted from a raster scanning type binary image.
Figure 2A:
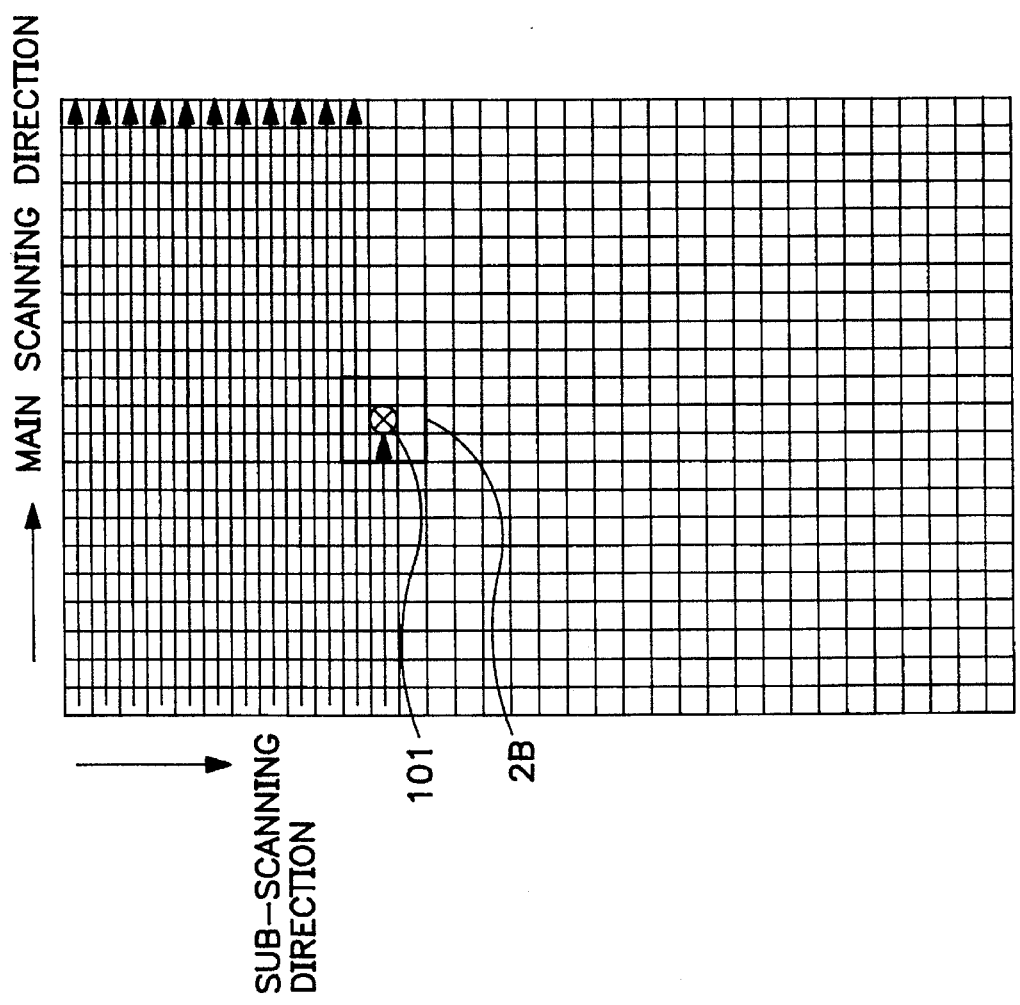

FIGS. 2A and 2B are diagrams for explaining how the raster scanning type binary image data outputted from the binary image obtaining unit 1 which is an input of the outline extractor 2 is extracted. That is, the binary image data outputted from the image obtaining unit 1 is used as input data of the outline extractor 2. In FIG. 2, the symbol ⊗ indicates a pixel of interest 101 of a binary image in the raster scanning and a 9-pixel area 102 including the pixel of interest and its 8 neighboring pixels is enlarged. The outline extractor 2 changes the pixel of interest in the raster scanning order, and detects a vector (a horizontal vector or a vertical vector) between the pixel of interest and the neighboring pixel in accordance with the state of each pixel (i.e., white pixel or black pixel) in the 9-pixel area 102. In the case where there are outline vectors, data such as coordinates of a start point and direction is extracted, and the outline vectors are connected while a rough outline vector loop is extracted.

Figure 3A:
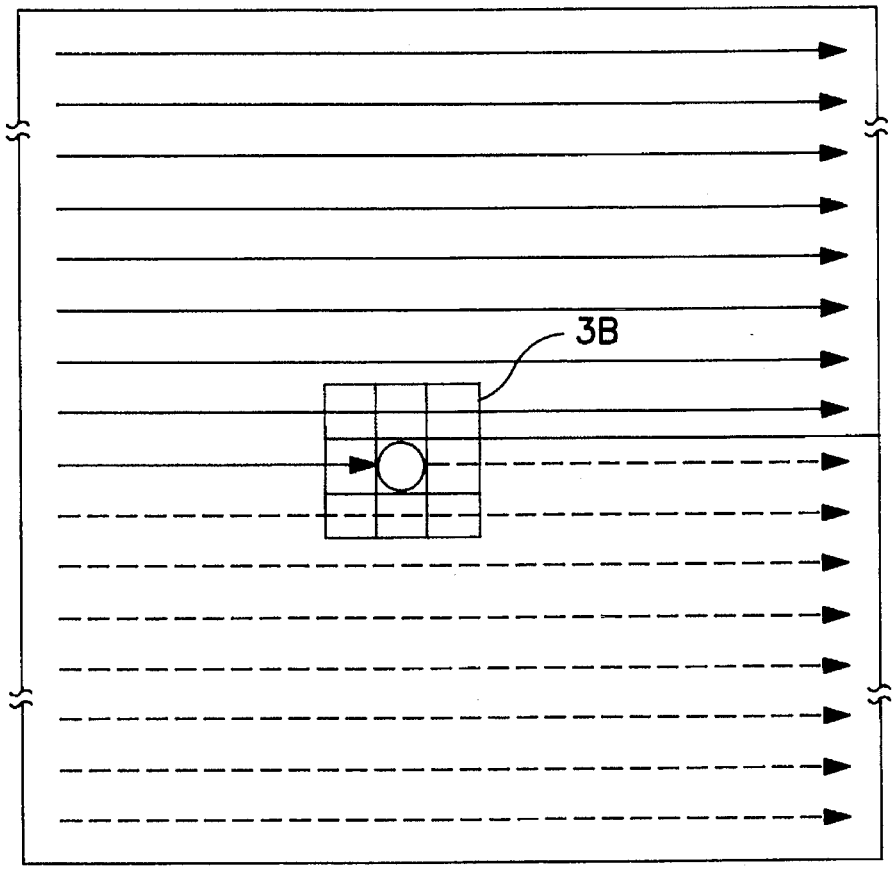
FIG. 3 is a diagram showing an example of the extraction of a outline vector between a pixel of interest and the neighboring pixel.
Figure 3B:
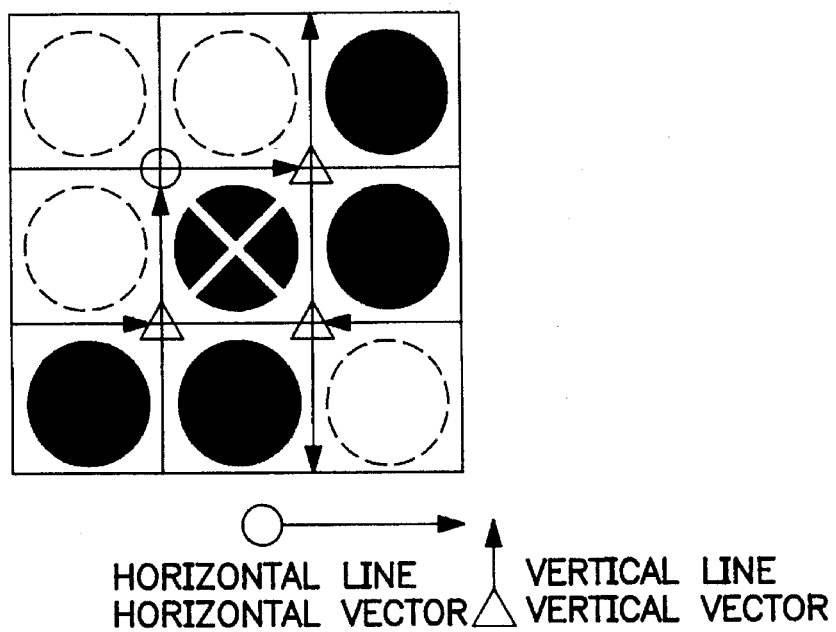

FIGS. 3A and 3B are diagrams illustrating an example of the extraction state of the vector between a pixel of interest and the neighboring pixel. In FIG. 3B, the symbol Δ represents a start point of a vertical vector and the symbol "O" represents a start point of horizontal vector.

Figure 4:
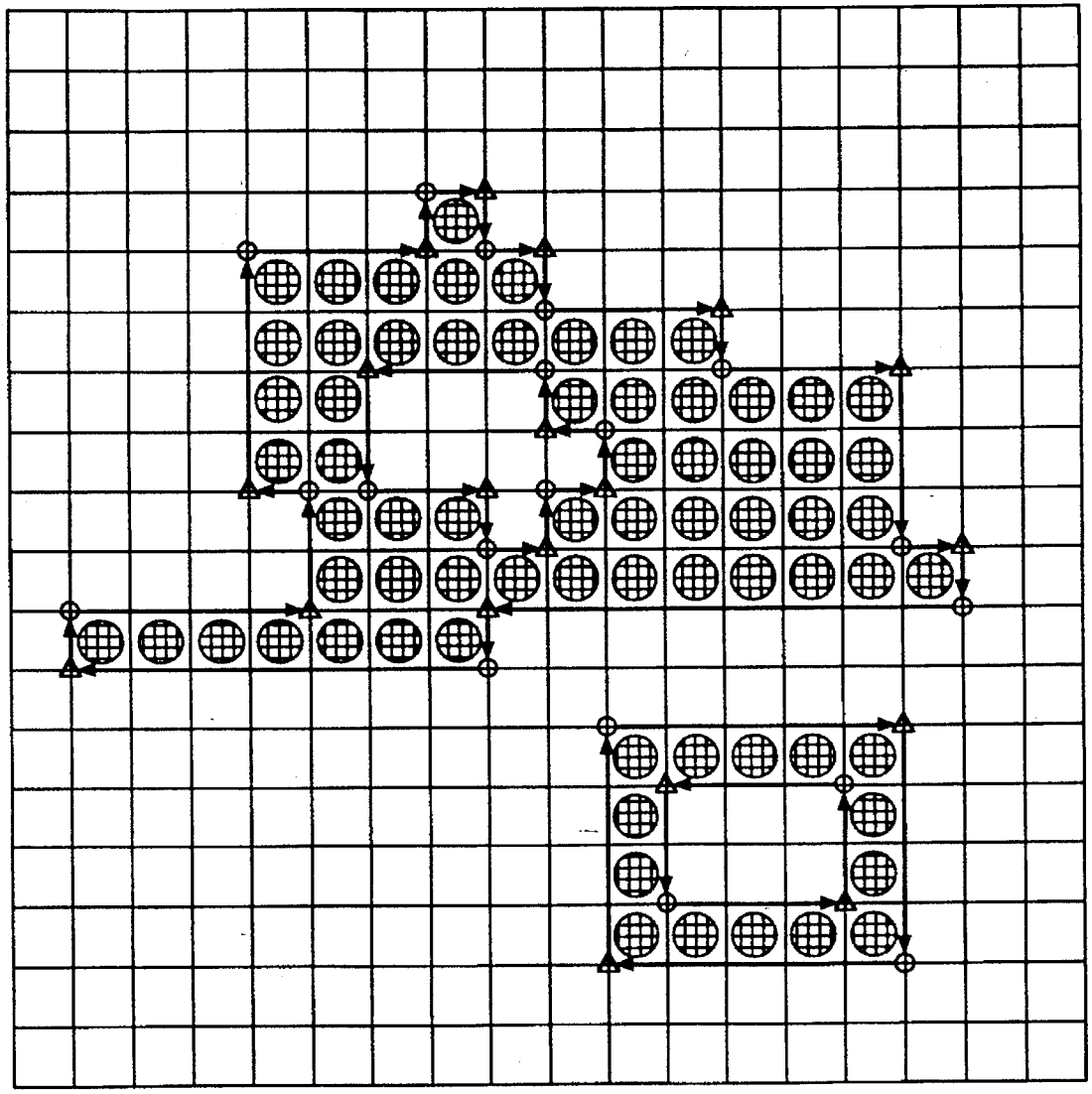
FIG. 4 is a diagram showing an example of a rough outline vector loop extracted by an outline extractor.
Figure 4:
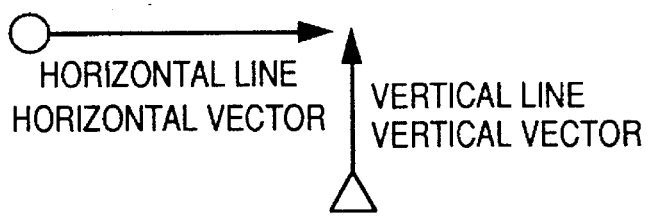

FIG. 4 shows an example of rough outline vector loops which are extracted by the outline extractor 2. Each square represents a pixel position of an input image. Each empty square represents a white pixel, while a symbol ⊕ represents a black pixel. Similar to FIG. 3B, the symbol Δ represents a start point of vertical vector and the symbol "O" represents a start point of horizontal vector. A rough outline vector loop is a group of outline vectors consisted of horizontal vectors and vertical vectors which are alternatively connected to each other to form an area of black pixels. As shown in FIG. 4, the outline extractor 2 extracts a rough outline vector loop so that the pixels at the right side in the vector's direction become black pixels.

The start point of each outline vector is extracted as an intermediate position between two pixels of an input image and a line having the width of a pixel is extracted as a rough outline vector loop enclosing the pixels which form the line. The group of the rough vector loops extracted in the above-described way is outputted from the outline extractor 2 in the data format shown in FIG. 5.

Figure 5:
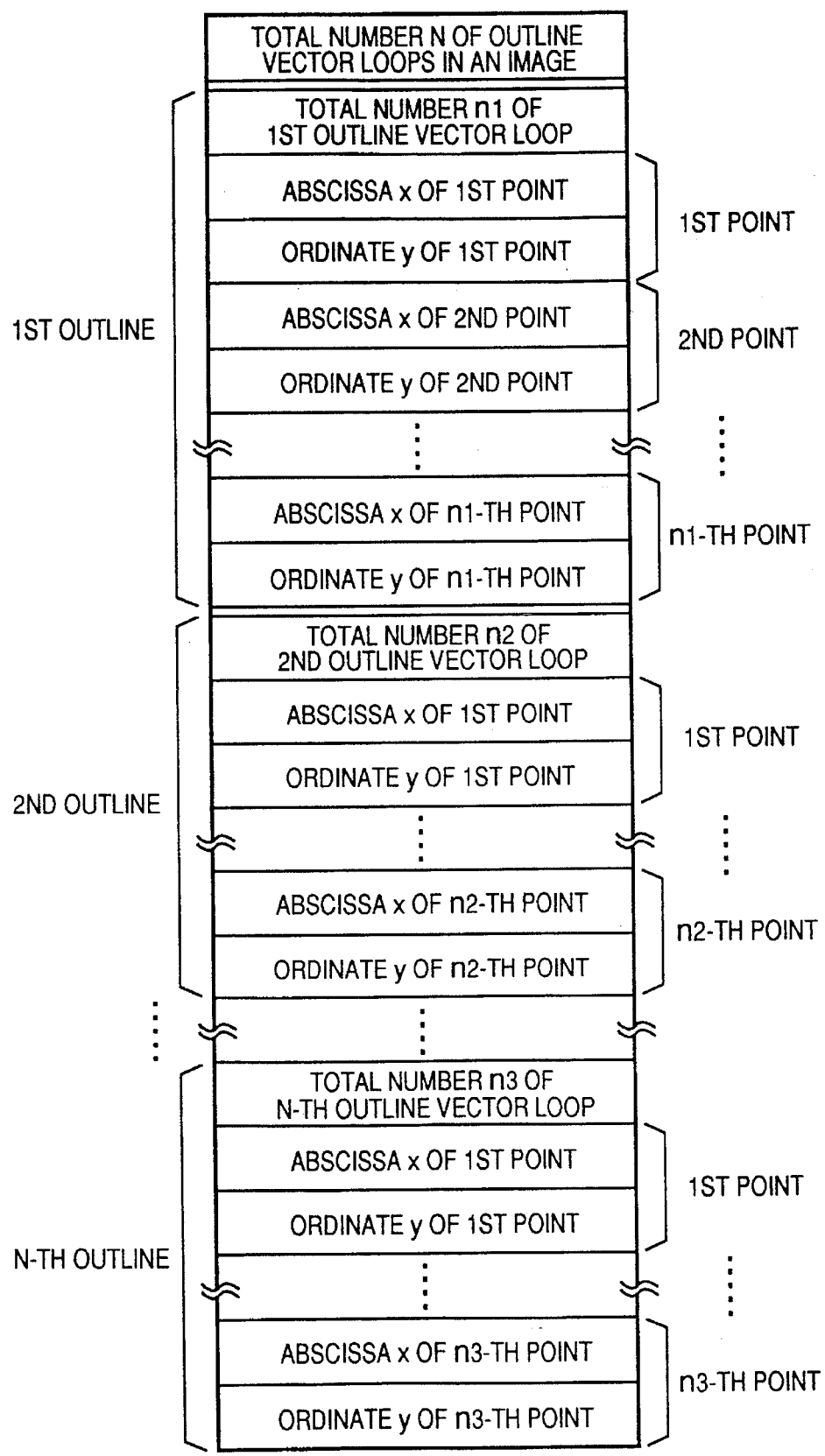
FIG. 5 is a diagram showing the storage state of the outline data outputted from the outline extractor.

The data shown in FIG. 5 is comprised of the total number "N" of outline vector loops which are extracted from the image and the group of data of each outline vector loop from the first outline vector loop and the N-th outline vector loop. Each rough outline vector loop data is comprised of the total number of start points of vectors in a rough outline vector loop (can be considered as the total number of outline vectors) and a set of coordinates of start points of each outline vector (abscissa x, ordinate y). Each ordered pair in the set is arranged in the order that the start of a horizontal vector and that of vertical vector are alternatively arranged. Note that the group of data shown in FIG. 5 is referred to as an "outline vector data table".

Figure 6:
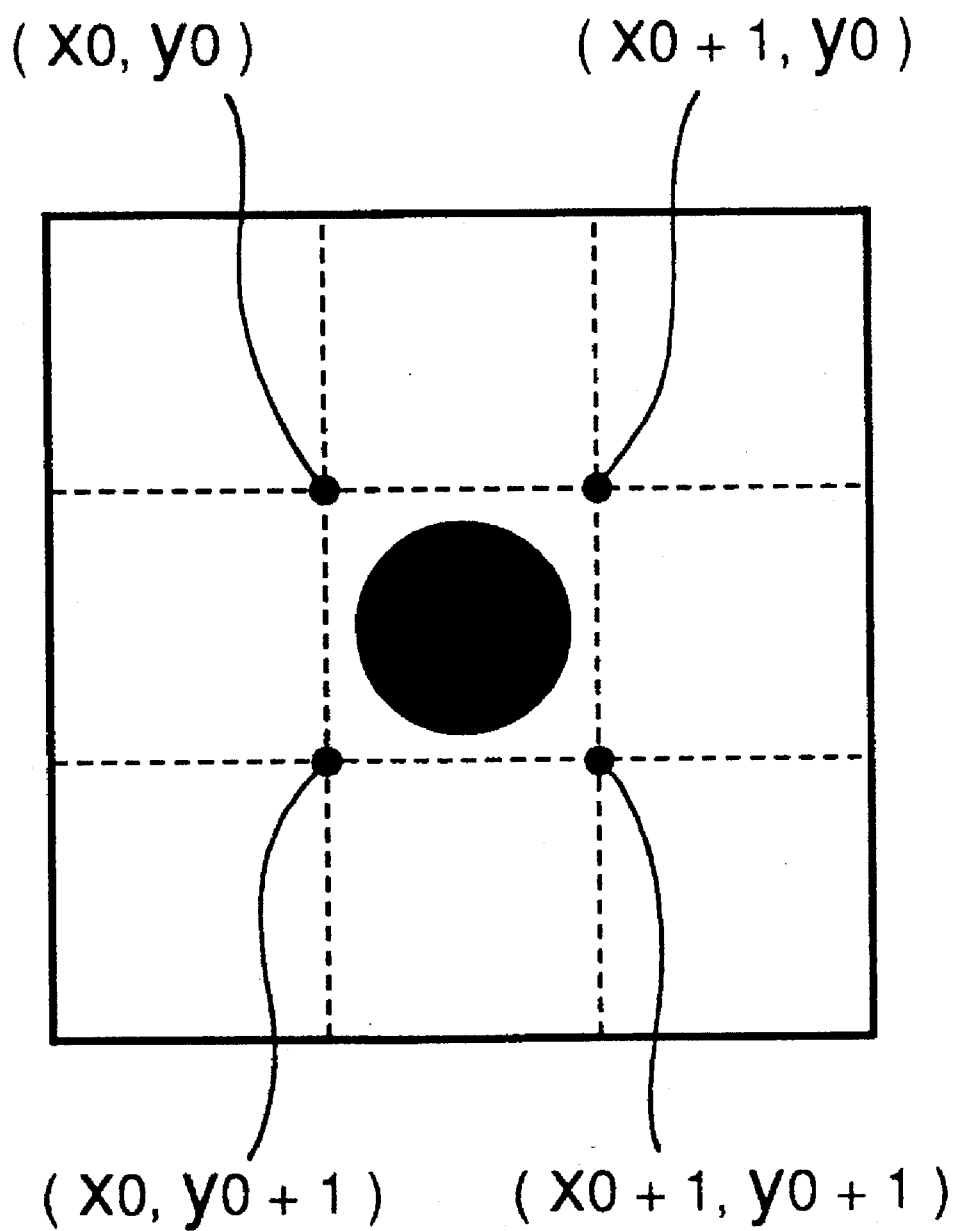
FIG. 6 is a diagram showing the outline vector coordinates when an isolated point is extracted.

When the outline extractor 2 extracts a rough outline vector, if all neighboring pixels with respect to the black pixel of interest are white pixels, that is, an isolated point as shown in FIG. 6 is extracted, the pixel of interest is not processed as a rough outline vector loop as described above, but as isolated point data in the isolated point data generator 7.

Figure 7:
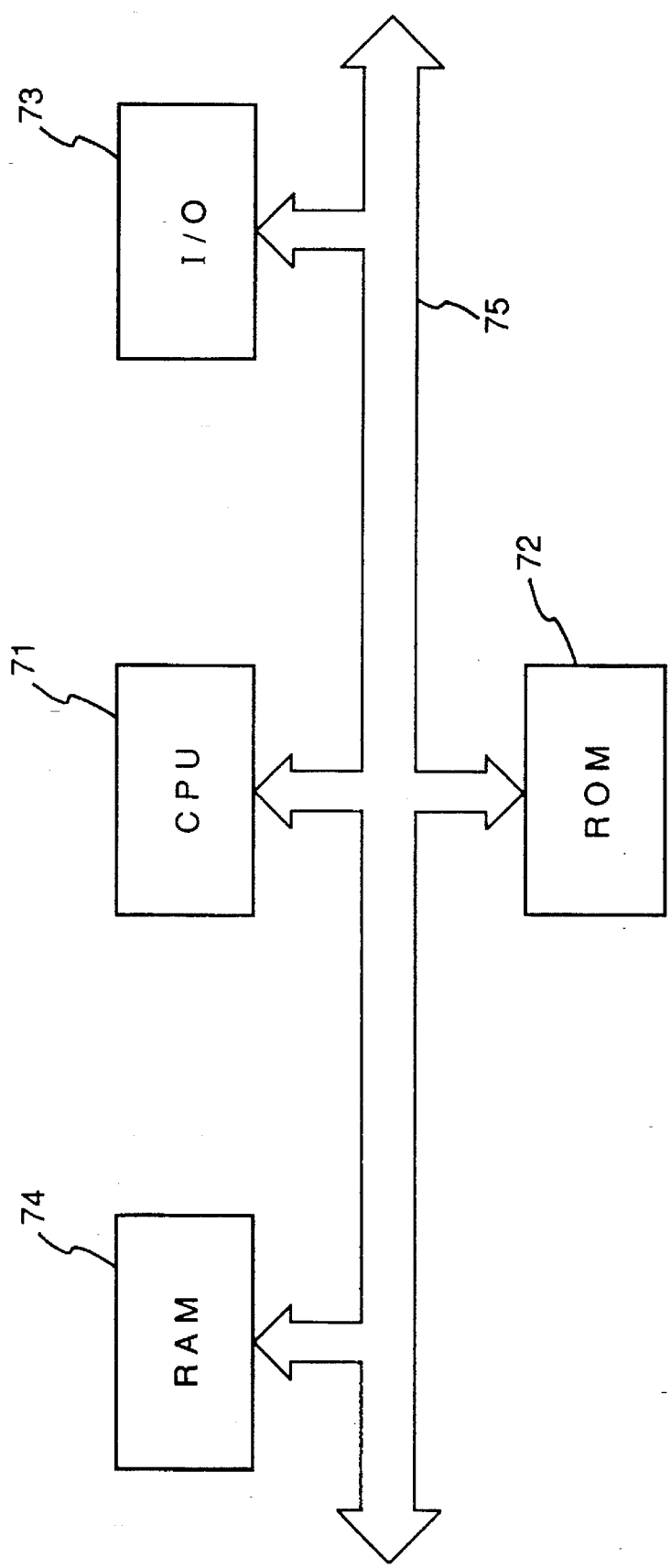
FIG. 7 is a block diagram illustrating the hardware construction of an outline processor of the image processing apparatus of the embodiment.

FIG. 7 is a diagram illustrating the hardware construction of the outline processor 100 in the image processing apparatus in the embodiment. In FIG. 7, CPU 71 is connected to ROM 72, I/O port 73 and RAM 74 via a bus 75. With this construction, an output of the outline extractor 2 is stored in the RAM 74 in the form of data shown in FIG. 5. The isolated point shown in FIG. 6 is a pixel enclosed by four points $(x_0, y_0)$, $(x_0+1, y_0)$, $(x_0+1, y_0+1)$ and $(x_0, y_0+1)$. Only the data of isolated point $(x_0, y_0)$ is stored in the form shown in FIG. 8 in a storage area of isolated point data. That is, the number "k" of isolated points in image data and x-coordinate value and y-coordinate value of each isolated point are stored.

The vector data generator 3 uses rough outline vector loop data outputted from the outline extractor 2 as input data to obtain a difference value between the coordinates of an end point and a start point determining a outline vector representing a part of an outline, and generates outline vector data by expressing the difference value in variable length. The vector generation processing can be executed when the CPU 71 processes the procedure of FIG. 9.

Figure 9:
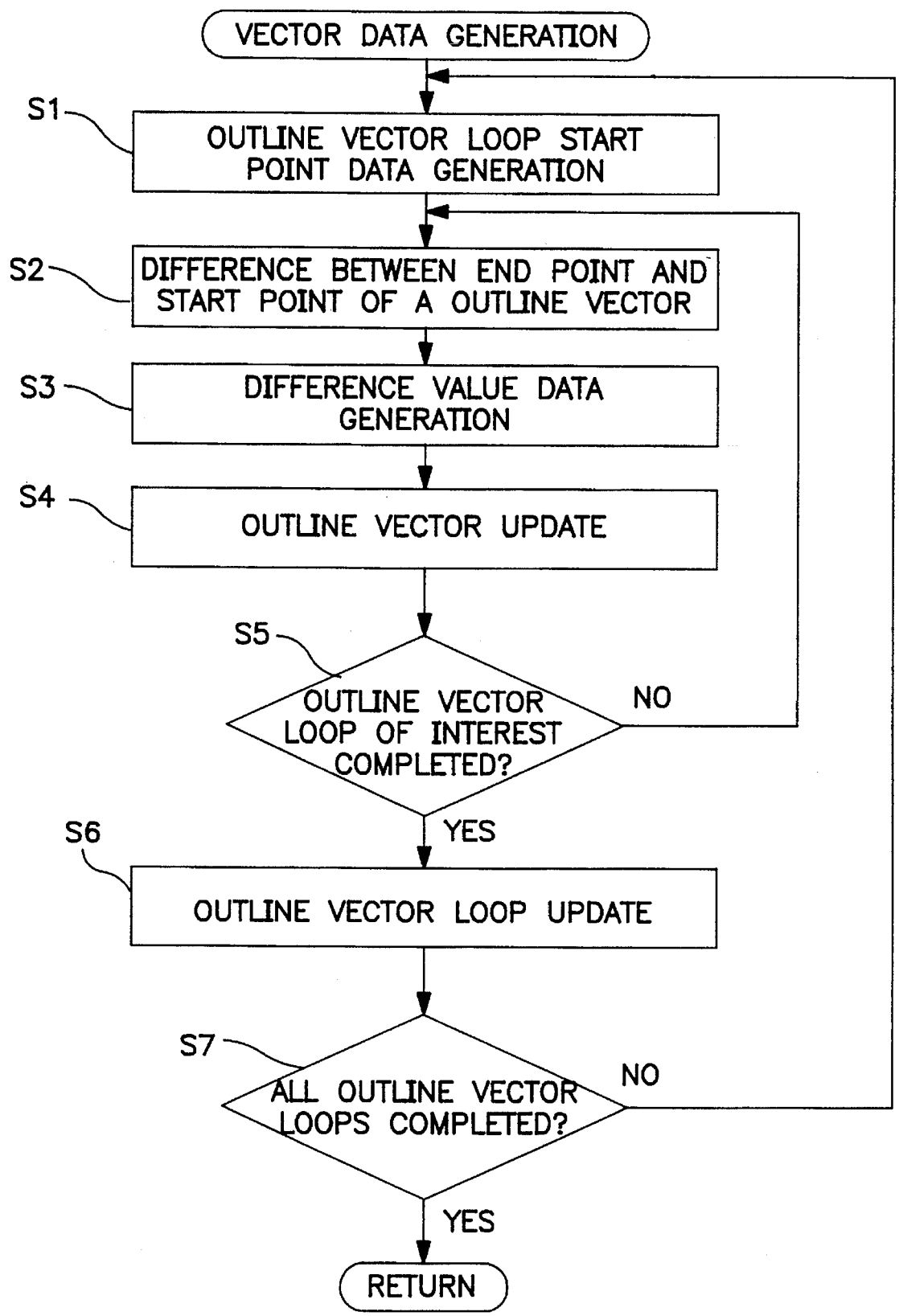
FIG. 9 is a flowchart for explaining a processing of vector data generation.

The vector generation processing in the vector data generator 3 is described below with reference to FIG. 9. The procedure of the flowchart in FIG. 9 is processed when the CPU 71 executes the programs stored in the ROM 72 or the RAM 74. Similar operation is needed for the other flowcharts attached to this specification.

Figure 10:
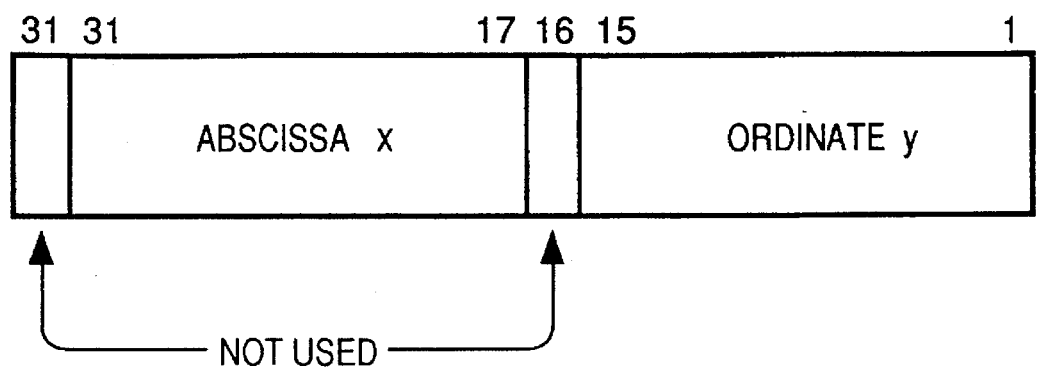
FIG. 10 is a diagram illustrating the data format of an outline start point.

At step S1, the coordinates of the first point of an outline vector loop of interest is determined as a start point and generates start-point coordinate value data in a fixed length to be stored in the RAM 74. The start-point coordinate value data is 32-bit fixed-length data as shown in FIG. 10. The most significant bits such as the 32nd bit and the 16th bit are not used, but 15 bits from the 17th bit to the 31st bit represent x-coordinates, while 15 bits from the 1st bit to the 15th bit represent y-coordinates. Accordingly, abscissa "x"

and ordinate "y" of a coordinate value (x, y) are respectively represented by 15-bit integers without sign.

At step S2, a coordinate difference value is obtained by subtracting the start-point coordinate value from the end-point coordinate value of the vector of interest. At step S3, data is generated for the coordinate difference value. If an ordinal coordinate expression is regarded as a difference between a position of interest and the origin, it is easily understood that the difference of the coordinate points next to each other is smaller than that of the ordinal expression. Accordingly, the coordinate expression by the difference is used as variable length data in accordance with the difference value.

At step S4, the outline vector of interest is advanced to the following vector, and it is determined whether or not the processing is performed on vectors in an outline vector loop at step S5. If not, the steps from S2 to S4 are repeated and coordinate difference value data is generated in each vector.

On the other hand, if the processing has ended for an outline vector loop, the process proceeds to a new outline vector loop at step S6, and it is examined if the processing has ended for all outline vector loops. If not, the steps S1 to S6 are repeated for the new outline vector loop.

Figure 12:
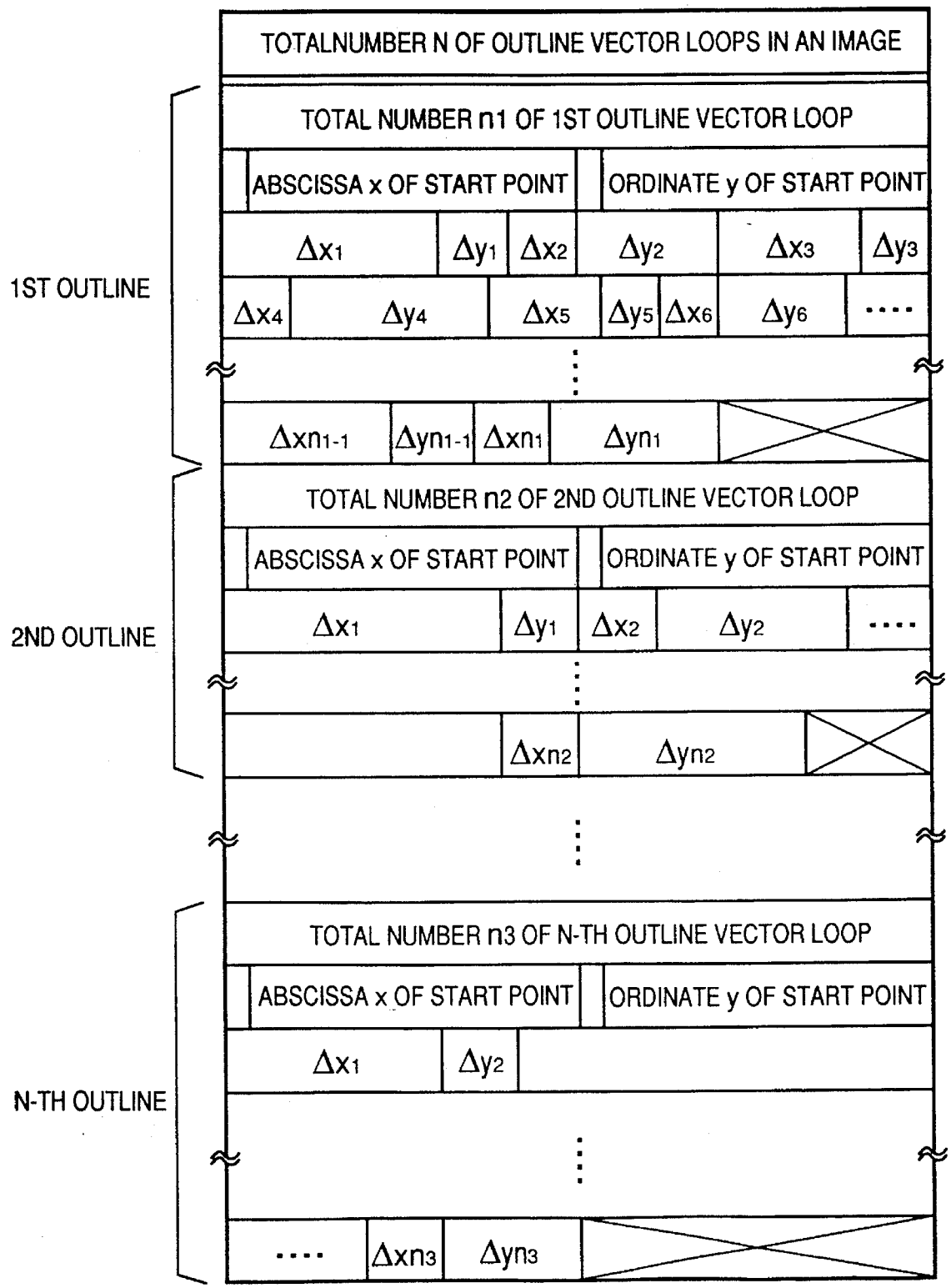
FIG. 12 is a diagram illustrating the storage state of an outline vector data table.

Accordingly, the data of outline vector loop represented by coordinate difference values is formed. The data is stored as a set of ordered pairs in each outline vector loop in a similar way to the data table of FIG. 5. In this case, the start point of the outline vector loop is represented by an ordinal coordinate value, and points following the start point are expressed by difference values and stored in a table. FIG. 12 shows the storage state of the outline vector data table. Note that both $\Delta x_1$ and $\Delta y_1$ are difference value data and variable length data.

Figure 13:
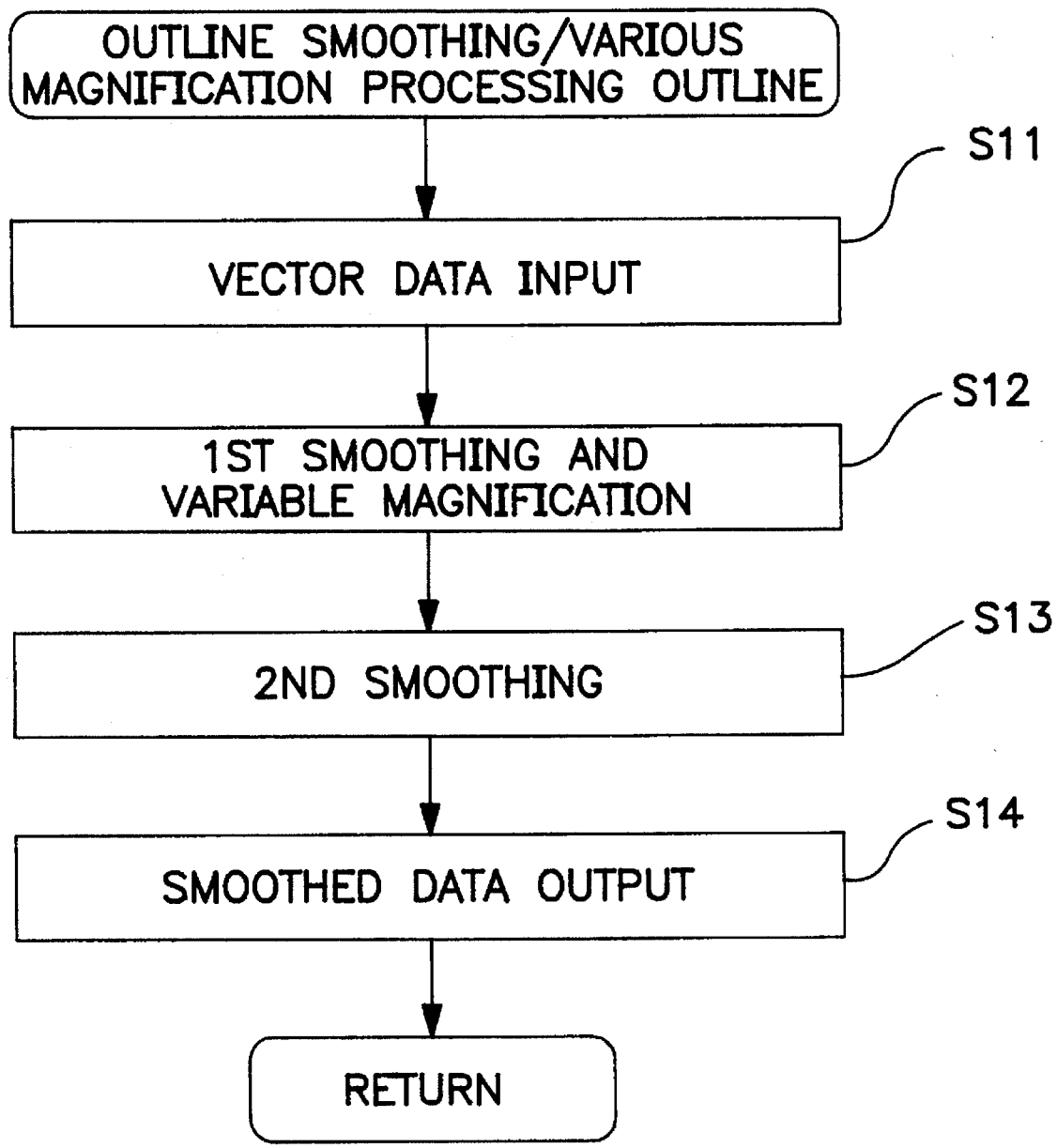
FIG. 13 is a flowchart illustrating the procedure of outline smoothing/various magnification processing.

The outline smoothing/variable magnification unit 4 is realized when the CPU 71 having the construction of FIG. 7 processes the procedure of FIG. 13. The procedure of the processing in the outline smoothing/variable magnification unit 4 is shown in FIG. 13.

At step S11, outline vector data outputted by the vector data generator 3 is received as an input. At step S12, each outline vector is classified into a pattern based on the combination of direction and length with the preceding or following vector. Based on the pattern, outline points for the vector of interest after the first smoothing processing are defined. These outline points are points which consist of corner points and other representative points. The first smoothing processing has three features, as follows:

(1) Removal of noise from an original;

(2) Preservation of sharp angles; and (3) Smoothing of a gentle slant lines.

Furthermore, enlargement and reduction processings of image are performed with the above processings.

At step S13, a weighting average is calculated from coordinate values of a point of interest and the preceding or following point in each representative point except a corner point on each outline vector loop. With respect to the corner point, coordinates at the corner point themselves are used as outline point coordinate values. Weighting coefficients used for weighing average are ¼ for the preceding or following point of interest and ½ for the point of interest.

Figure 14:
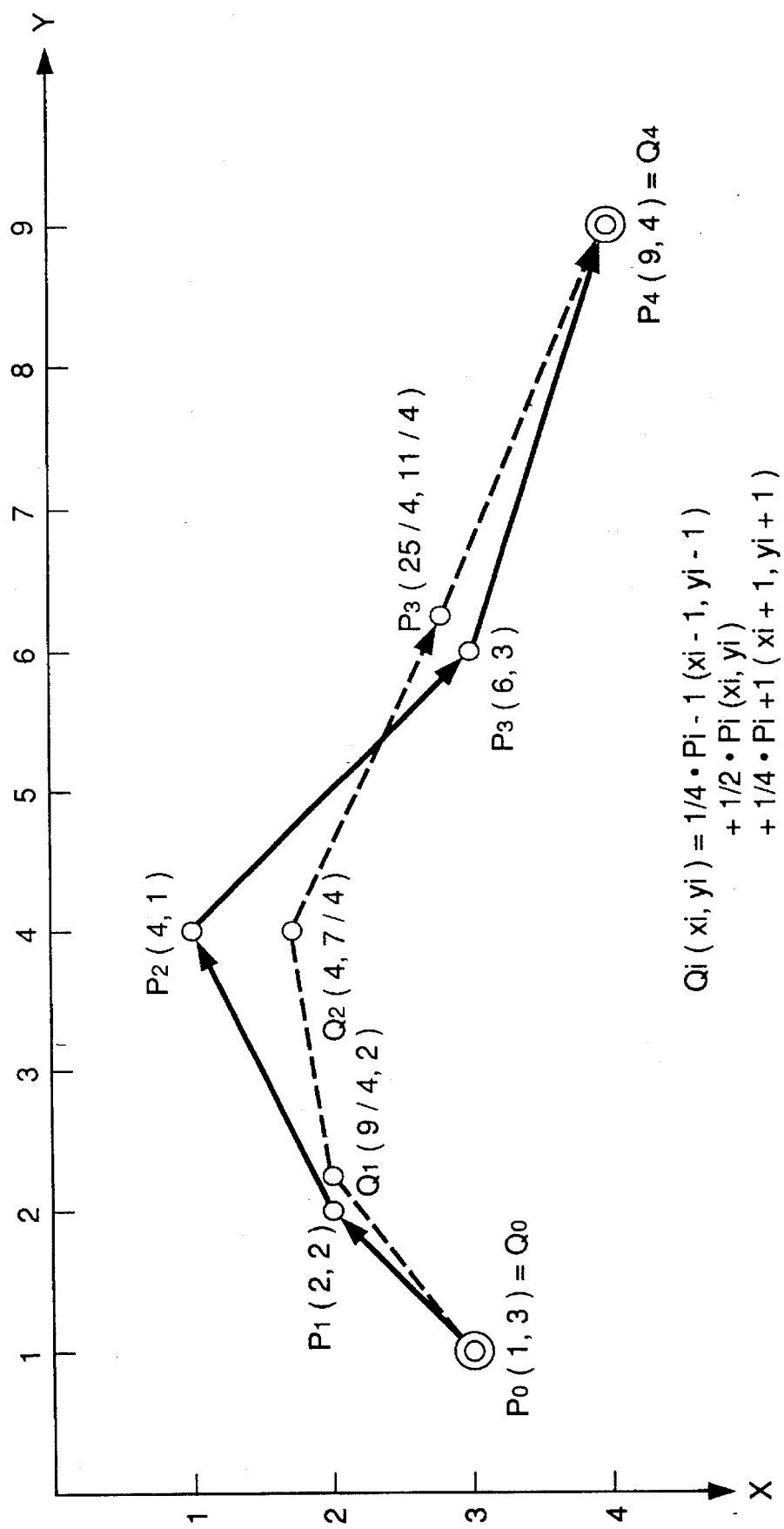
FIG. 14 is a diagram showing an example of a second smoothing processing.

The second smoothing processing is shown in FIG. 14. In FIG. 14, the coordinates of the outline point before smoothing processing are expressed by Pi. On each component of Pi (x, y), the point Qi is obtained by the following equation:

$$Qi=(¼)·Pi-1+(½)·Pi+(¼)·Pi+1$$

The outline consisting of the points Qi is an outline after the second smoothing processing.

At step S14, the outline vector data on which the second smoothing processing is performed is outputted, and then the smoothing/variable magnification processing is ended.

Figure 8:
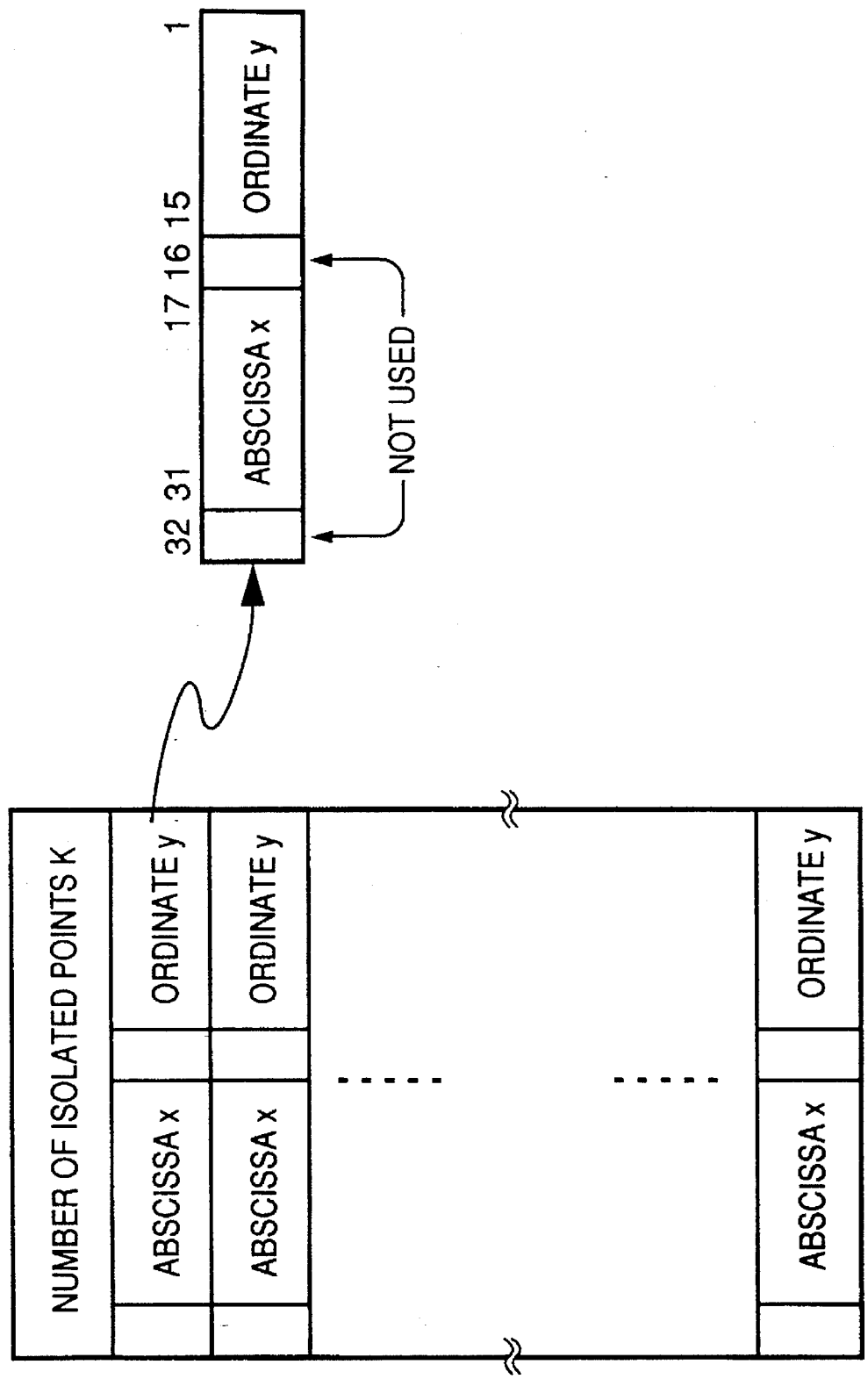
FIG. 8 is a block diagram of a vector data generator.
Figure 15:
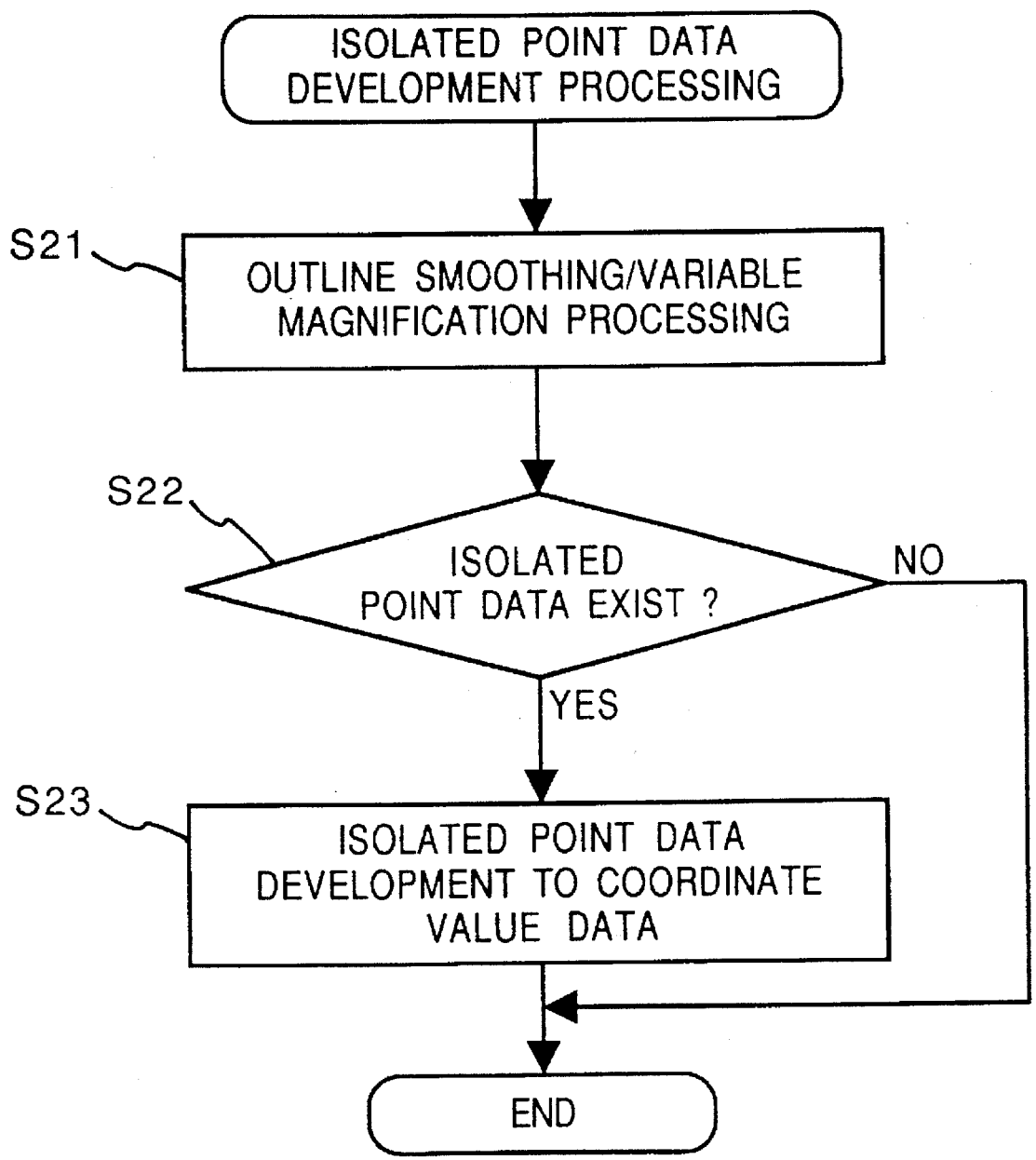
FIG. 15 is a flowchart illustrating a procedure of isolated point data development processing.

The processing in a case where isolated data exists is described along with the flowchart of FIG. 15. In FIG. 15, at step S21, the smoothing/variable magnification processing (the flowchart of FIG. 13) is performed by the outline smoothing/variable magnification 4. At step S22, it is determined if isolated data as shown in FIG. 8 exists. If any exists, the process proceeds to step S23, while if not, the present processing ends. At step S23, the isolated point developer 8 develops the isolated point data $(x_0, y_0)$ to coordinate value data. The coordinate value data can be obtained from the isolated point data $(x_0, y_0)$ are $(k_x x_0, k_y Y_0)$, $(k_x(x_0+1), k_y Y_0)$, $(k_x(x_0+1), k_y(Y_0+1))$, $(k_x x_0, k_y(Y_0+1))$. Note that $k_x$ and $k_y$ are respectively magnification rates in the main scanning direction and the sub-scanning direction. When the development processing of isolated point data ends, the data is transferred to the binary image reproduction unit 5 with the output from the outline smoothing/variable magnification unit 4.

The binary image reproduction unit 5 converts the outline vector data transferred via the I/O after the second smoothing processing, and outputs a binary raster scanning image of the enclosing outline vector loops. The outputted raster scanning type data is visualized by the binary image output unit 6 such as a video printer.

The outline smoothing/variable magnification unit 4 sequentially obtains a needed coordinate value from the outline start-point coordinate value outputted from the vector data generator 3 and coordinate difference value of the outline vector, and performs the smoothing/variable processing after the data in difference expression is converted to the ordinal coordinate expression. The block diagram of the control structure of the processor where the expression by the coordinate difference value is converted to the ordinal coordinate expression is shown in FIG. 16.

Figure 16:
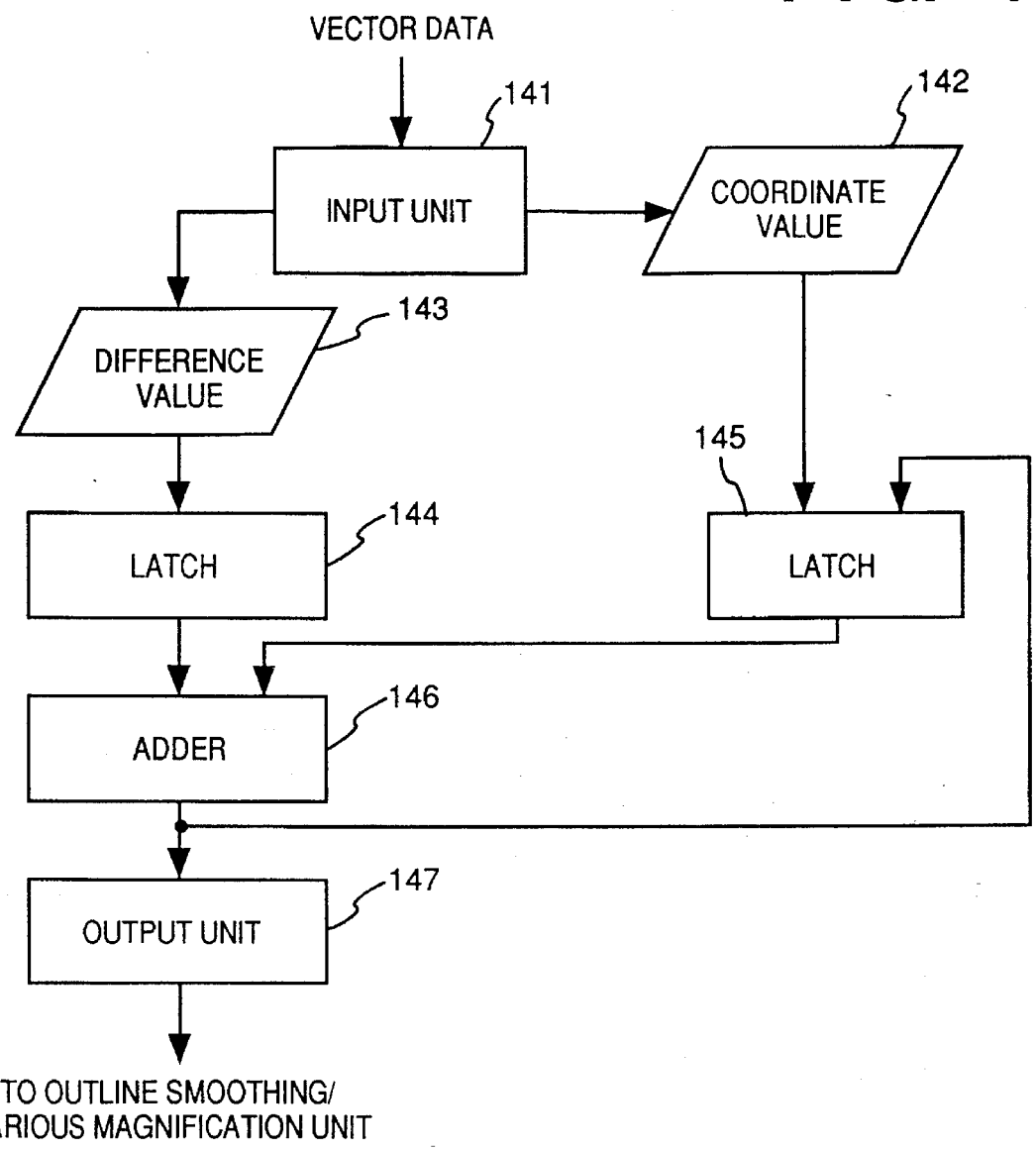
FIG. 16 is a block diagram illustrating the control structure of a processor which converts a vector expression in a coordinate difference value into the ordinary coordinate expression.

In FIG. 16, the outputs of the vector data generator 3 is inputted into the input unit 141, and the outline start-point coordinate value 142 is held in latch 145, while the difference value 143 is held in latch 144. The values in the latch 144 and 145 are added in the adder 146, and the obtained coordinate value is outputted to the output unit 147 and the value in the latch 145 is updated to the value obtained by the adder 146. In this case, if an initial value of the difference value 143 is "0", the coordinate value 142 is outputted as a start point. The coordinate value outputted in this way is an input of the outline smoothing/variable magnification unit 4. This processing is executed when the CPU 71 processes control programs stored in the ROM 72.

Figure 17:
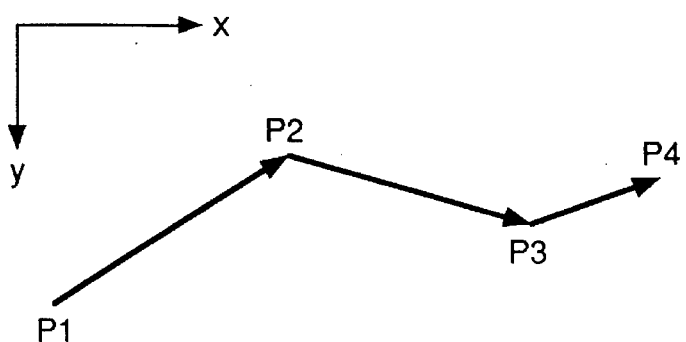
FIG. 17 is a diagram illustrating a part of vectors comprising an outline.

The binary image reproduction unit 5 converts the image into raster type data. In the image, the outline vector is regarded as an outline and one side of the outline vector is blackened. For the conversion, three vectors such as a vector of interest, the preceding and the following vector are required. FIG. 17 shows a part of the vectors comprising an outline. As apparent from FIG. 17, the binary image reproduction unit 5 using three continuing vectors requires four coordinate points such as P1~P4. The binary image reproduction unit 5 is operated by using registers (not shown) to hold four coordinate values. These four registers delete the oldest coordinate values and use the latest coordinate values which are sequentially inputted while a vector of interest is updated. The processing by the binary image reproduction unit 5 can be a well-known procedure. The binary image output unit 6 displays an output on a CRT or prints the output by a printer based on the raster data obtained in the binary image reproduction unit 5.

As described above, according to the image processing apparatus of the embodiment, in the outline processing of a digital binary image, outline vectors are expressed by the difference coordinate with the neighboring points, thus compressing the vector data. Furthermore, the information concerning the isolated point data is not stored as vector data, but as position information, and this position data is developed and processed in a case of image processing. Accordingly, a storage capacity required for holding the outline vector data is reduced for the image such as a pseudo halftone image.

Figure 18:
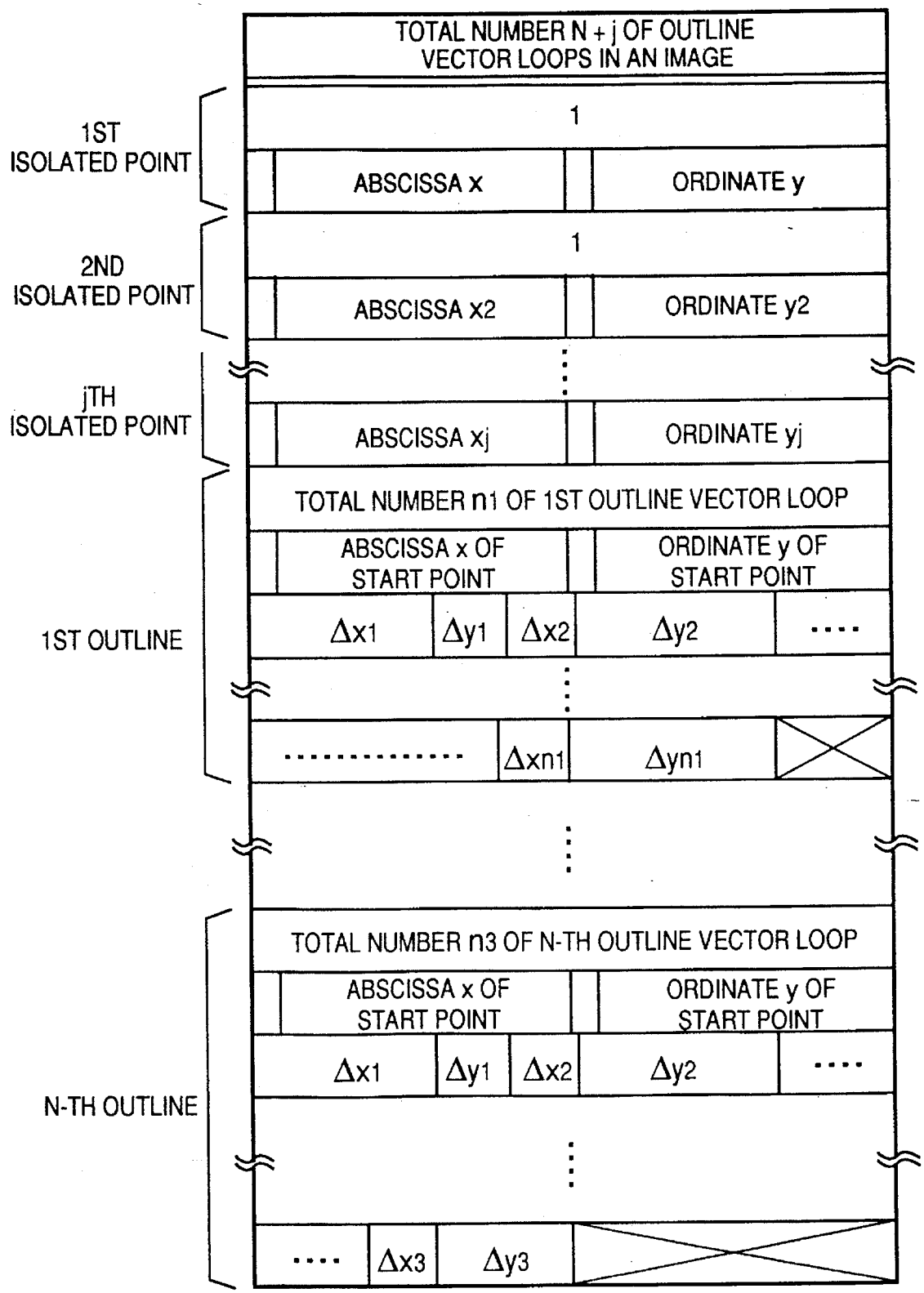
FIG. 18 is a diagram illustrating the data storage state of the image processing apparatus of the second embodiment.
Figure 19:
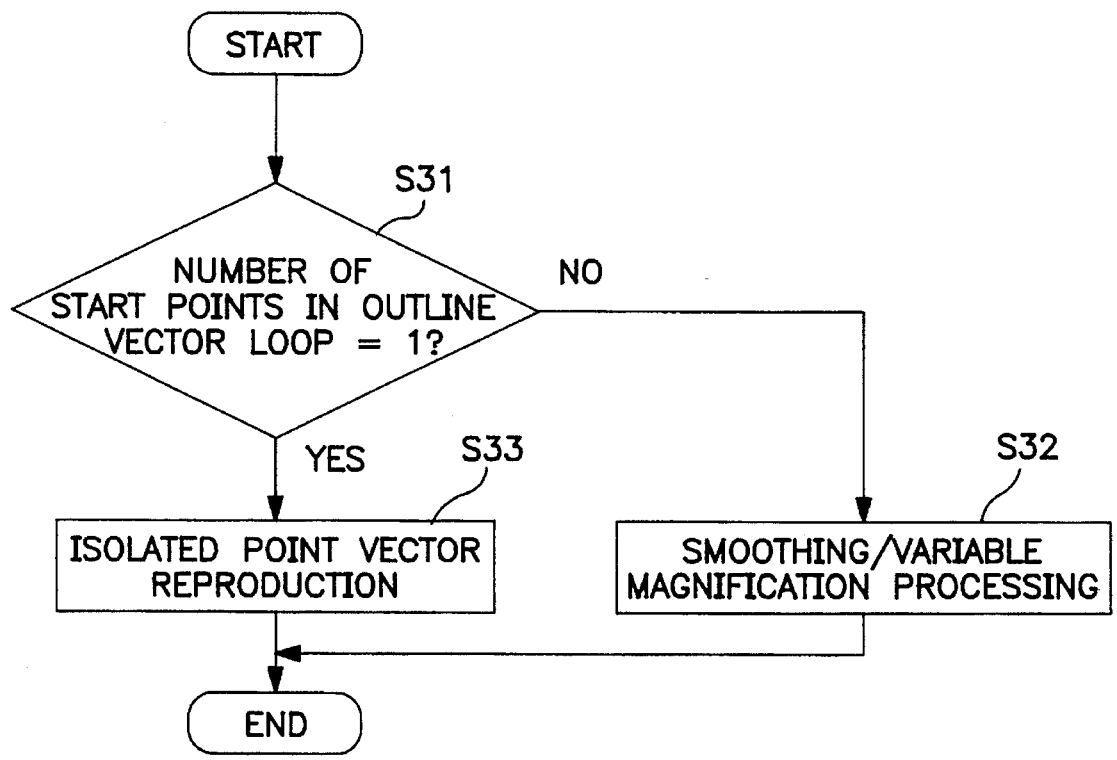
FIG. 19 is a flowchart showing a procedure to select a processing for isolated point data and an outline smoothing/variable magnification processing.

In the image processing apparatus with the above construction, the isolated data is stored in an area separated from the area for outline vector data, however, those data can be stored in the same area. In this case, as shown in FIG. 18, the number of start points in an outline of the isolated data is set to "1". Selection between the processing of the isolated data and that of the outline smoothing/variable magnification processing is shown in the flowchart of FIG. 19.

At step S31, it is checked if the total number of start points in the outline is "1". If not, it means that the data is not data of an isolated point, therefore, the process proceeds to step S32 where the smoothing/variable magnification is executed for an ordinal outline vector. On the other hand, if the total number is "1", it means that the data is an isolated point data, therefore, the process proceeds to step S33 where outline vector data of isolated points is developed. Accordingly, the processing is selected between the reproduction processing of isolated vector or the conventional smoothing/variable magnification processing based on the total number of start points.

Accordingly, a single image is expressed by the data of a single table by storing isolated point data in an outline vector loop table.

Figure 20A:
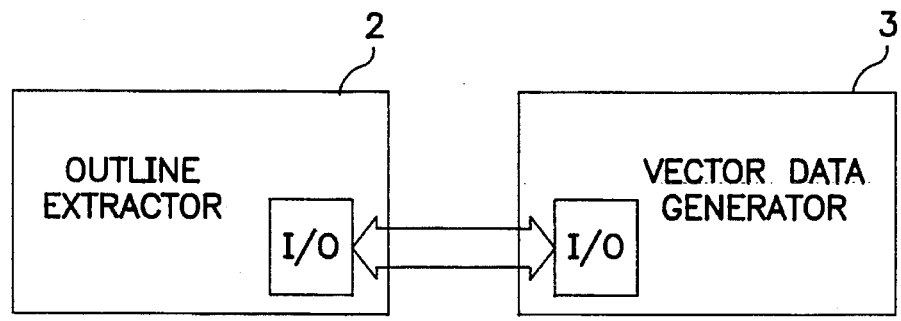
FIG. 20A is a diagram illustrating an interface between the outline extractor and the outline smoothing/variable magnification unit in the image processing apparatus of a third embodiment.

In this embodiment, the rough outline vector loop data extracted by the outline extractor 2 which is outputted from the RAM 74 of FIG. 7 is used as an input for the vector data generator 3. However, instead of using the memory, as shown in FIG. 20A, data transmission/reception can be performed between the outline extractor 2 and the vector data generator 3 through communication between I/Os. That is, the vector data generator 3 receives data from the outline extractor 2 via I/O, instead of receiving the data when all the data is prepared. The data includes the total number of start points in an image, the total number of start points in the first outline, the abscissa of the first start point, the ordinate of the first start point, ..., and the vector data generator 3 receives the data in this order.

Figure 20B:
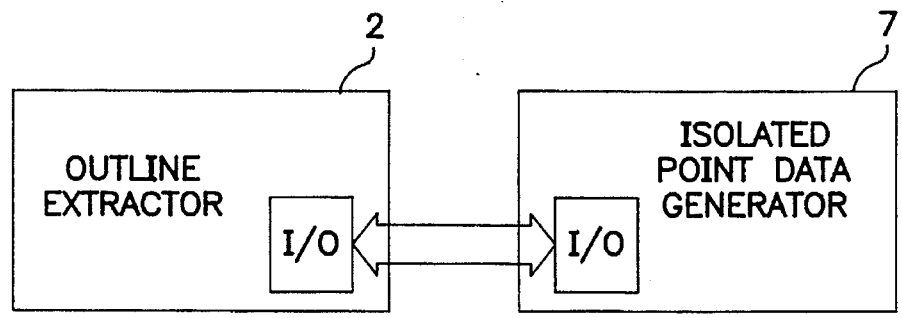
FIG. 20B is a diagram illustrating an interface between the outline extractor and the isolated point data generator in the image processing apparatus in the third embodiment.

Similarly, as shown in FIG. 20B, vector data can be transferred sequentially if the outline extractor 2 and the isolated point data generator 7 are connected by the I/O. Furthermore, the vector data can be transferred by not only separated I/Os, but also the same I/O.

Accordingly, the vector data generator 3 can be constructed so as to generate vector data while coordinate values of following outline point are received by using the coordinate values received in the way as described above.

As described above, the vector data generator 3 sequentially performs processing on the extracted outline vector data. Accordingly, the outline vector data is generated while outline vector loops are extracted, and thus the data processing efficiency can be improved.

[Second Embodiment]

The case where the image processing apparatus according to the first embodiment is applied to a facsimile apparatus is described below. The construction is shown in FIGS. 21, 22 and 23.

Figure 21:
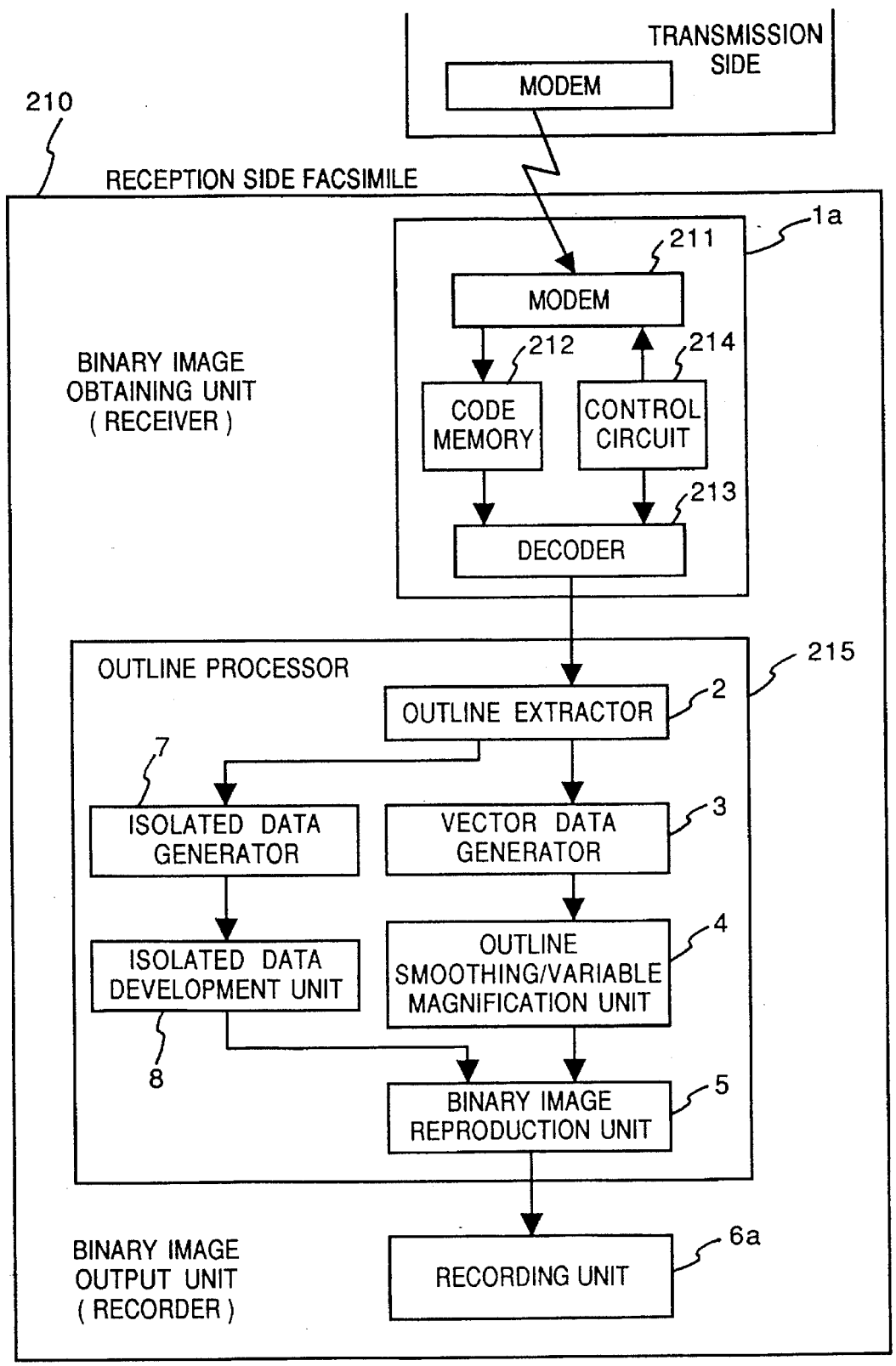
FIG. 21 is a block diagram illustrating the construction when the image processing apparatus of the present invention is applied to a facsimile terminal at a receiving side.

FIG. 21 is a diagram illustrating the control structure when the image processing apparatus of the first embodiment is applied to a facsimile apparatus 210 at the reception side. Binary image obtaining unit 1a includes a MODEM 211, code memory 212, decoder 213 and control circuit 214. The binary image obtaining unit 1a receives transmission data which is coded by MH coding via the MODEM 211. The decoder 213 decodes the received data, generates input binary image data, and transfers the data to the outline processor 215. The outline processor 215 includes the outline extractor 2, vector data generator 3, outline smoothing/variable magnification unit 4, binary image reproduction unit 5, isolated point data generator 7 and isolated point data developer 8, and performs the processings described in the first embodiment. The image data processed in the outline processor 215 is outputted to a piece of paper by a recording apparatus 6a or displayed on a display apparatus (not shown).

Figure 22:
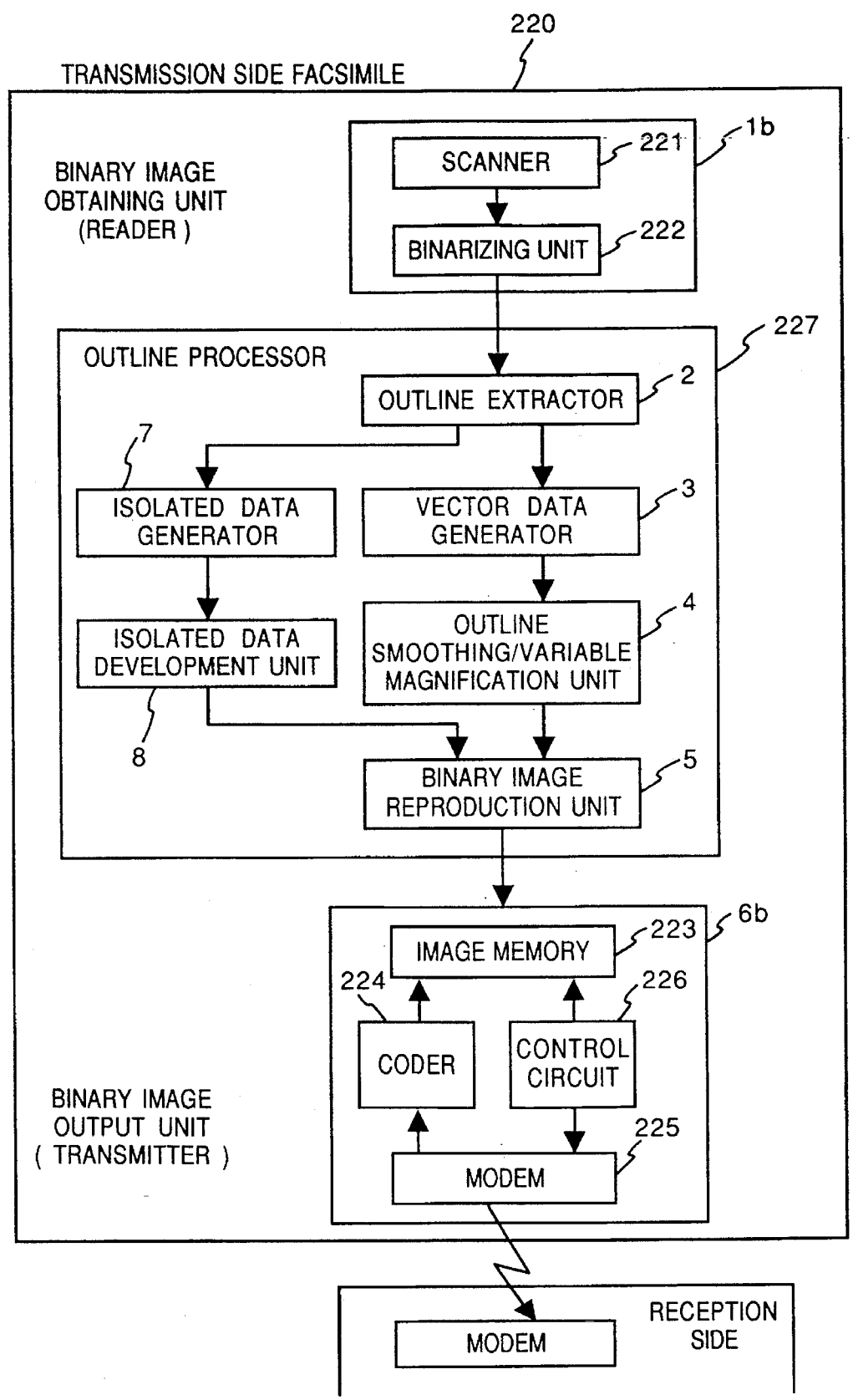
FIG. 22 is a block diagram illustrating the construction when the image processing apparatus of the present invention is applied to a facsimile terminal at a transmitting side.

FIG. 22 is a block diagram illustrating the control structure when the image processing apparatus of the first embodiment is applied to the facsimile apparatus 220 at the transmission side. Binary image obtaining unit 1b binarizes an image signal inputted by a scanner 221 in a binarizing unit 222 to form input image data. This input image data is transferred to the outline processor 227 and is subject to the processings described in the first embodiment. The binary image which is processed and reproduced in the outline processor 227 is stored in the image memory 223, converted to a code such as MH code by the coder 224, and transmitted via the MODEM 225.

Figure 23:
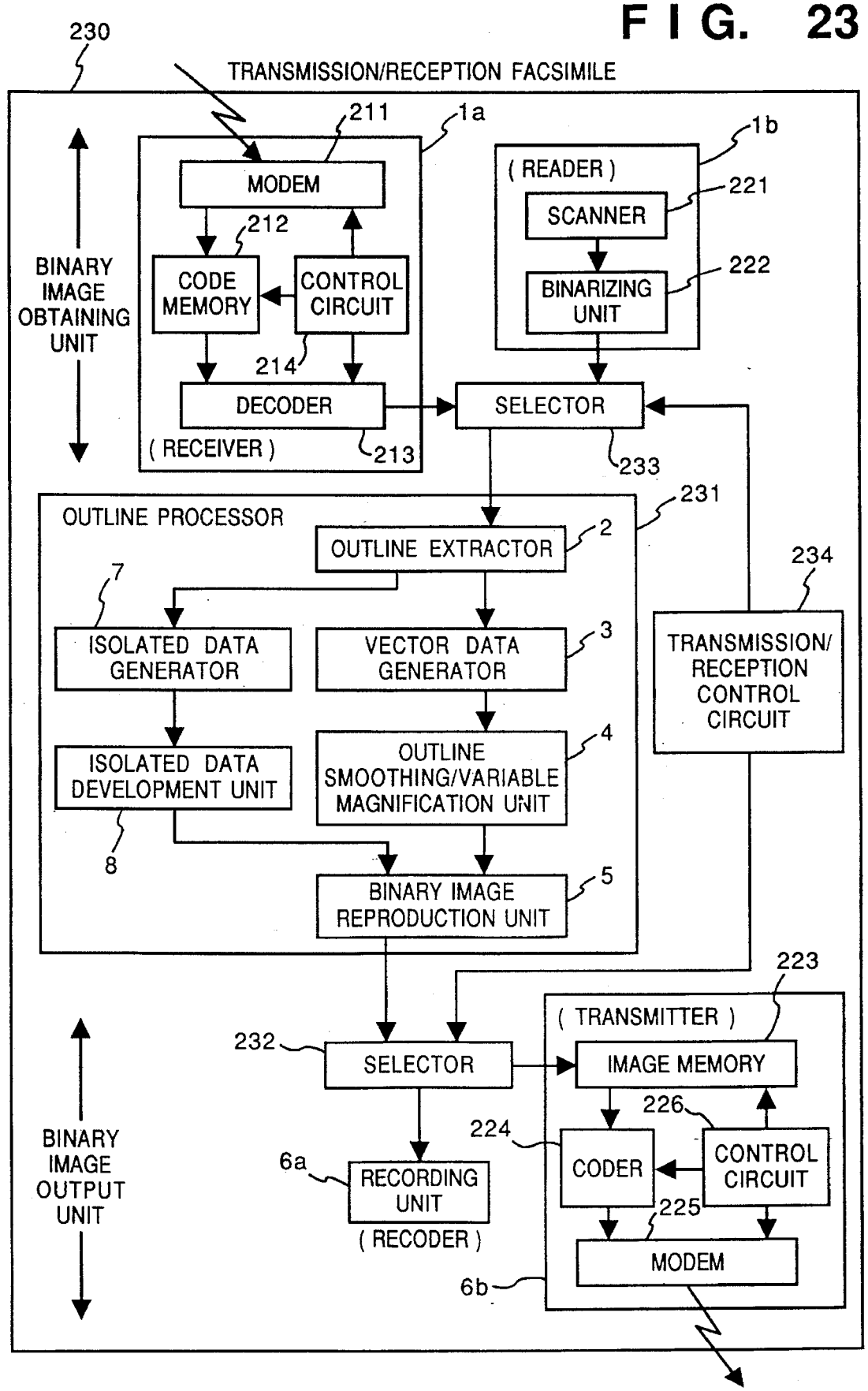
FIG. 23 is a block diagram illustrating the image processing apparatus of the present invention is applied to a facsimile terminal for reception/transmission.

FIG. 23 is a block diagram illustrating the control structure when the image processing apparatus of the first embodiment is applied to the facsimile apparatus 230 for transmission/reception. This is the case where the above two embodiments are combined. The portions which are identical to those in the first embodiment have the same reference numerals.

The transmission/reception control circuit 234 shown in FIG. 23 determines an originator of image data (either the binary image obtaining unit 1a or 1b) and a designation (either the binary image output unit 6a or 6b) with respect to the outline processor 231. Here, it is possible to select the reader 1b as a binary image obtaining unit and the recorder 6a as a binary image output unit. In this case, a digital copier (or a copy mode) having a variable magnification function can be executed.

Furthermore, vector data can be expressed by difference value data on which the Huffman coding is performed, instead of variable length data in accordance with the above-described difference value. This can be applied not only to this embodiment, but also the image processing apparatus of the first embodiment.

Figure 11:
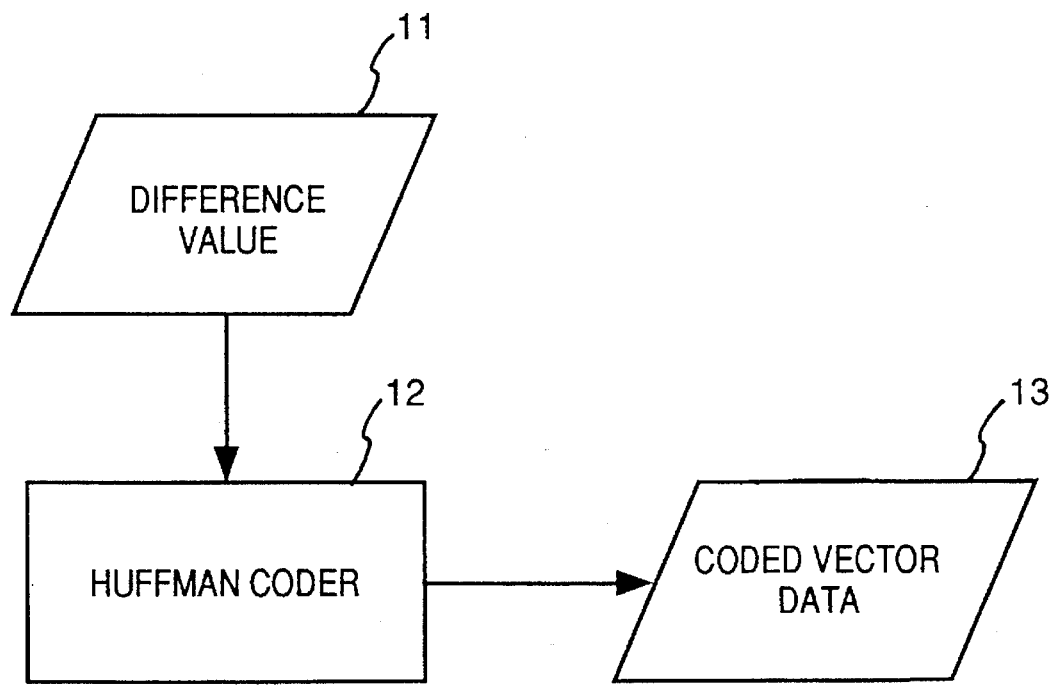
FIG. 11 is a block diagram showing the processing state where coded vector difference value data is generated.

FIG. 11 is a diagram illustrating the control structure of the difference value data generation processing. The Huffman coder 12 has a Huffman code table (it can have a plurality of such tables) provided in advance, and outputs vector data 13 which is coded by allotting a Huffman code to the difference value 11 of each outline vector.

Figure 24:
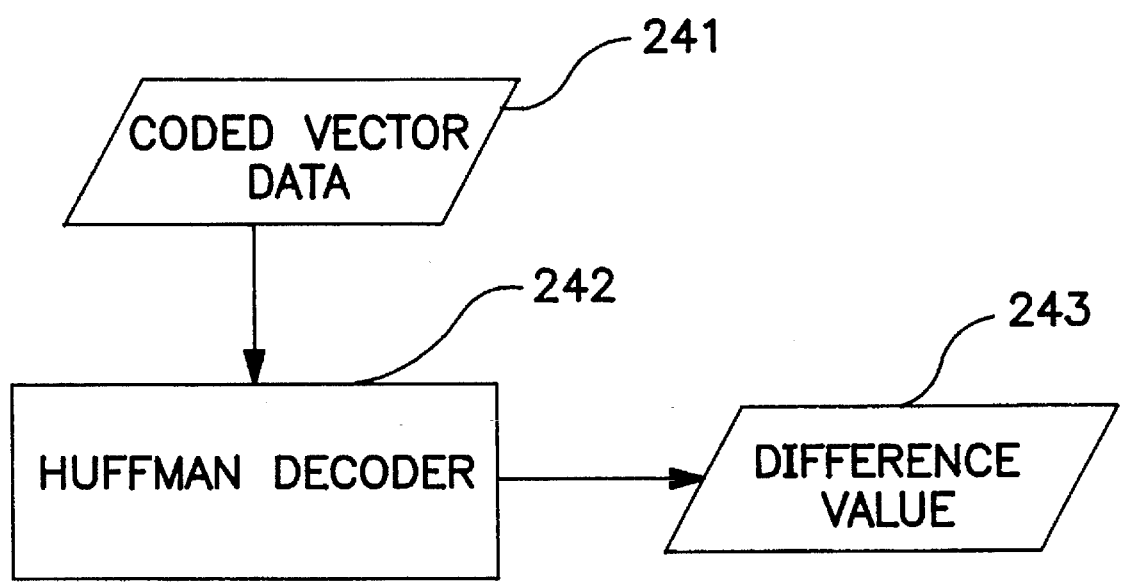
FIG. 24 is a block diagram illustrating the reproduction process of a vector difference value from coded vector difference value data.

In this case, the processing shown in FIG. 24 is performed before the difference value described in FIG. 16 is converted to coordinate data, and the difference value on which the Huffman coding is performed is converted to the ordinal difference value. That is, the processing described in FIG. 16 is performed after the coded vector data 241 is decoded in accordance the Huffman code table prepared in advance, and the difference value 243 of the outline vector is reproduced.

The facsimile apparatus as described above performs a smoothing/variable magnification processing on image data in the form of outline vector data table. This data includes the vector expressed by the difference and isolated point value expressed by position. Accordingly, the amount of data to be held as outline vector data can be small and the required storage capacity and processing time can be reduced. This is particularly effective for pseudo-halftone image data.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

extraction means for extracting isolated pixels from a binary image;

first generation means for generating outline vectors which represent boundary of black pixels and white pixels by scanning the binary image except the isolated pixels;

first storage means for storing position data which represents a position of the isolated pixels extracted by said extraction means;

second storage means for storing vector data which represents the outline vectors generated by said first generation means;

second generation means for generating the outline vectors which represent boundary of the isolated pixels on the basis of the position data stored in said first storage means; and reproduction means for reproducing a binary image by using the outline vectors stored in said second storage means and the outline vectors generated by said second generation means.

2. The apparatus according to claim 1, wherein said reproduction means includes smoothing/variable magnification means for performing either smoothing or variable magnification processing by using the outline vectors stored in said second storage means and the outline vectors generated by said second generation means.

3. The apparatus according to claim 1, wherein said second storage means sequentially stores vector data when generated by said first generation means, and said first storage means sequentially stores position data of isolated pixels when extracted by said extraction means.

4. The apparatus according to claim 1, wherein said second storage means stores vector data as a difference with start-point coordinates of a neighboring vector.

5. The apparatus according to claim 1, further comprising:

input means for inputting an binary image; and output mean for outputting a binary image reproduced by said reproduction means.

6. The apparatus according to claim 5, wherein said input means is an image scanner and said output means is a data transmission unit.

7. The apparatus according to claim 1, further comprising:

output means for outputting the binary image reproduced by said reproduction means.

8. The apparatus according to claim 7, wherein said output means includes a printer.

9. The apparatus according to claim 7, wherein said output means includes a display.

10. The apparatus according to claim 1, wherein the position data stored in said first storage means is coordinate data of a start-point of vectors which enclose each of the isolated pixels.

11. The apparatus according to claim 1, wherein each of the outline vectors is a horizontal or a vertical vector.

12. The apparatus according to claim 1, wherein said first storage means and said second storage means share a memory unit.

13. An image processing method comprising:

an extraction step for extracting isolated pixels from a binary image;

a first generation step for generating outline vectors which represent boundary of black pixels and white pixels by scanning the binary image except the isolated pixels;

a first storage step for storing position data which represents a position of the isolated pixels;

a second storage step for storing vector data which represents the outline vectors generated in said first generation step;

a second generation step for generating the outline vectors which represent boundary of the isolated pixels on the basis of the position data stored in said first storage step; and a reproduction step for reproducing a binary image by using the outline vectors stored in said second storage step and the outline vectors generated in said second generation step.

14. The method according to claim 13, wherein said reproduction step includes a smoothing/variable magnification step for performing either smoothing or variable magnification processing by using the outline vectors stored in said second storage step and the outline vectors generated in said second generation step.

15. The method according to claim 13, wherein said second storage step includes sequentially storing vector data when generated in said first generation step, and said first storage step includes sequentially storing position data of an isolated pixels when extracted in said extraction step.

16. The method according to claim 13, wherein said second storage step includes storing vector data as a difference with start-point coordinates of a neighboring vector.

17. The method according to claim 13, further comprising:

an input step for inputting an binary image; and an output step for outputting a binary image reproduced in said reproduction step.

18. The method according to claim 13, further comprising:

an output step for outputting the binary image reproduced in said reproduction step.

19. The method according to claim 18, wherein said output step includes outputting the binary image using a printer.

20. The method according to claim 18, wherein said output step includes outputting the binary image using a display.

21. The method according to claim 13, wherein the data stored in said first storage step is coordinate data of a start-point of vectors which enclose each of the isolated pixels.

22. The method according to claim 13, wherein each of the outline vectors is a horizontal or a vertical vector.

23. The method according to claim 13, wherein said first storage step and said second storage step include storing data in different area of a memory unit from each other.

24. An image processing apparatus comprising:

input means for inputting image data;

detection means for detecting isolated pixels from the image data inputted by said input means; and storage means for storing position data of the isolated pixels detected by said detection means.

25. The apparatus according to claim 24, further comprising:

generation means for generating vector data which represents outline vectors on the basis of the position data stored in said storage means, wherein the outline vectors represent a boundary of black pixels and white pixels; and reproduction means for reproducing image data on the basis of the vector data generated by said generating means.

26. The apparatus according to claim 25, wherein said reproduction means includes smoothing/variable magnification means for performing either smoothing or variable magnification processing by using the vector data generated by said generation means.

27. The apparatus according to claim 25, further comprising:

output means for outputting a binary image reproduced by said reproduction means.

28. The apparatus according to claim 27, wherein said output means includes a printer.

29. The apparatus according to claim 27, wherein said output means includes a display.

30. The apparatus according to claim 25, wherein each of the outline vectors is a horizontal or a vertical vector.

31. The apparatus according to claim 24, wherein said storage means sequentially stores data which represents a position of an isolated pixel when detected by said detection means.

32. The apparatus according to claim 25, wherein said generation means generates vector data which represent an outline vector as a difference with start-point coordinates of a neighboring vector.

33. The apparatus according to claim 24, wherein the data stored by said storage means is coordinate data of a start-point of vectors which enclose each of the isolated pixels.

34. An image processing method comprising:

an input step for inputting image data;

a detection step for detecting isolated pixels from the image data inputted in said input step; and a storage step for storing position data of the isolated pixels detected in said detection step.

35. The method according to claim 34, further comprising:

a generation step for generating vector data which represents outline vectors on the basis of the position data stored in said storage step, wherein the outline vectors represent boundary of black pixels and white pixels; and a reproduction step for reproducing image data on the basis of the vector data generated in said generating step.

36. The method according to claim 34, wherein said reproduction step includes:

a smoothing/variable magnification step for performing either smoothing or variable magnification processing by using the vector data generated in said generation step.

37. The method according to claim 35, further comprising:

an output step for outputting a binary image reproduced in said reproduction step.

38. The method according to claim 37, wherein said output step includes outputting the binary data using a printer.

39. The method according to claim 37, wherein said output step includes outputting the binary data using a display.

40. The method according to claim 35, wherein each of the outline vectors is a horizontal or a vertical vector.

41. The method according to claim 34, wherein staid storage step includes sequentially storing data which represent a position of an isolated pixel when detected in said detection step.

42. The method according to claim 35, wherein said generation step includes generating vector data which represent an outline vector as a difference with start-point coordinates of a neighboring vector.

43. The method according to claim 34, wherein the data stored in said storage step is coordinate data of a start-point of vectors which enclose each of the isolated pixels.

44. A facsimile apparatus comprising:

reception means for receiving binary image data;

extraction means for extracting isolated pixels from a binary image data received by said reception means;

first generation means for generating outline vectors which represent boundary of black pixels and white pixels by scanning the binary image data received by said reception means except the isolated pixels;

first storage means for storing position data which represents a position of the isolated pixels extracted by said extraction means;

second storage means for storing vector data which represents the outline vectors generated by said first generation means;

second generation means for generating the outline vectors which represent boundary pixels on the basis of the position data stored in said first storage means;

reproduction means for reproducing a binary image by using the outline vectors stored in said second storage means and the outline vectors generated by said second generation means; and output means for printing the binary image reproduced by said reproduction means.

45. The apparatus according to claim 44, wherein the data stored by said first storage means is coordinate data of a start-point of vectors which enclose each of the isolated pixels.

46. The apparatus according to claim 44, wherein each of the outline vectors is a horizontal or a vertical vector.

47. The apparatus according to claim 44, wherein said first storage means and said second storage means share a memory unit.

48. A facsimile apparatus comprising:

data obtaining means for obtaining binary data by scanning an image;

first generation means for generating outline vectors which represent boundary of black pixels and white pixels by scanning the binary data received by said data obtaining means except the isolated pixels;

extraction means for extracting isolated pixels from the binary image obtained by said obtaining means;

first storage means for storing position data which represents a position of the isolated pixels extracted by said extraction means;

second storage means for storing vector data which represents the outline vector generated by said first generation means;

second generation means for generating the outline vectors which represent boundary of the isolated pixels on the basis of the position data stored in said first storage means;

reproduction means for reproducing a binary image by using the outline vectors stored in said second storage means and the outline vectors generated by said second generation means; and transmission means for transmitting the binary image reproduced by said reproduction means.

49. The apparatus according to claim 48, further comprising:

output means for outputting the binary image reproduced by said reproduction means.

50. The apparatus according to claim 49, wherein said output means includes a printer.

51. The apparatus according to claim 49, wherein said output means includes a display.

52. The apparatus according to claim 48, wherein the data stored by said first storage means is coordinate data of a start-point of vectors which enclose each of the isolated pixels.

53. The apparatus according to claim 48, wherein each of the outline vectors is a horizontal or a vertical vector.

54. The apparatus according to claim 48, wherein said first storage means and said second storage means share a memory unit.

55. A facsimile apparatus comprising:

reception means for receiving binary image data;

data obtaining means for obtaining binary image data by scanning an image;

first selection means for selecting either the binary image data received by said reception means or the binary image obtained by said data obtaining means;

extraction means for extracting isolated pixels from the binary image data selected by said first selection means;

first generation means for generating outline vectors which represent boundary of black pixel(s) and white pixel(s) by scanning the binary image data selected by said first selection means, except the isolated pixels;

first storage means for storing position data which represents a position of the isolated pixels extracted by said extraction means;

second storage means for storing vector data which represents the outline vectors generated by said first generation means;

second generation means for generating the outline vectors which represent boundary of the isolated pixels on the basis of the position data stored in said first storage means;

reproduction means for reproducing a binary image by using the outline vectors stored in said second storage means and the outline vectors generated by said second generation means; and transmission means for transmitting the binary image;

output means for printing the binary image; and second selection means for selecting whether the binary image reproduced by said reproduction means is outputted by said output means or the binary image is transmitted by said transmission means.

56. The apparatus according to claim 55, wherein said output means includes a printer.

57. The apparatus according to claim 55, wherein said output means includes a display.

58. The apparatus according to claim 55, wherein the data stored by said first storage means is coordinate data of a start-point of vector which enclose each of the isolated pixels.

59. The apparatus according to claim 55, wherein each of the outline vectors is a horizontal or a vertical vector.

60. The apparatus according to claim 55, wherein said first storage means and said second storage means share a memory unit.

* * * * *

UNITED STATES PATENT AND TRADEMARK OFFICE
CERTIFICATE OF CORRECTION

PATENT NO. : 5,515,179  
DATED : May 7, 1996  
INVENTOR(S) : JUNICHI YAMAKAWA, ET AL.

It is certified that error appears in the above-indentified patent and that said Letters Patent is hereby corrected as shown below:

Drawings:

SHEET 9

In Figure 9, "A OUTLINE" should read --AN OUTLINE--.

SHEET 11

In Figure 12, "TOTALNUMBER" should read --TOTAL NUMBER--.

COLUMN 1

Line 62, "Fig. 3 is a diagram" should read
--Figs. 3A and 3B are diagrams--.

COLUMN 2

Line 9, "a processing" should read --processing--; and
Line 50, "illustrating the" should read
--illustrating when the--.

COLUMN 3

Line 38, "extracted." should read --extracted.
Fig. 2B is an enlarged view of the area
designated in Fig. 2A by reference character
2B.--;
Line 40, "Fig. 2," should read --Figs. 2A and 2B,--;
Line 42, "scanning" should read --scanning,--;

UNITED STATES PATENT AND TRADEMARK OFFICE
CERTIFICATE OF CORRECTION

PATENT NO. : 5,515,179  
DATED : May 7, 1996  
INVENTOR(S) : JUNICHI YAMAKAWA, ET AL.

It is certified that error appears in the above-indentified patent and that said Letters Patent is hereby corrected as shown below:

COLUMN 3,

Line 55, "pixel." should read --pixel. Fig. 3B is an enlarged view of the area designated in Fig. 3A by reference character 3B. (Fig. 3B should be viewed as if dotted projection lines respectively connected the (i) top left, (ii) top right, (iii) bottom left, and (iv) bottom right corners of the 9-pixel area in Fig. 3B, to the (i) bottom left, (ii) bottom right, (iii) top left, and (iv) top right corners of the 9-pixel area 3B in Fig. 3A.)--;
Line 57, "of" should read --of a--;
Line 63, "of" should read --of a--;
Line 65, "of" should read --of a--; and
Line 66, "consisted" should read --consisting--.

COLUMN 4

Line 15, "and" should read --to--;
Line 22, "of" should read --of a--;
Line 30, "but" should read --but rather--;
Line 40, "stored" should read --stored,--;
Line 41, "Fig. 8" should read --Fig. 8,--;
Line 42, ""k"" should read --"K"--, "in" should read --in the--, and "and" should read --and the--;
Line 48, "a outline" should read --an outline--; and
Line 61, "generates" should read --there is generated--.

COLUMN 5

Line 47, "of a" should read --of--.

UNITED STATES PATENT AND TRADEMARK OFFICE
CERTIFICATE OF CORRECTION

PATENT NO. : 5,515,179
DATED : May 7, 1996
INVENTOR(S) : JUNICHI YAMAKAWA, ET AL.

It is certified that error appears in the above-indentified patent and that said Letters Patent is hereby corrected as shown below:

COLUMN 6

Line 13, "$k_yY_0)$" should read --$k_yy_0)$--; and
Line 14, "$k_yY_0)$," should read --$k_yy_0)$,--;
"$k_y(Y_0+1))$," should read --$k_y(y_0+1))$,--;
and "$k_y(Y_0+1))$." should read --$k_y(y_0+1))$.--.

COLUMN 7

Line 14, "data," should read --data;--.

COLUMN 9

Line 33, "the outline" should read --outline--;
Line 56, "an binary" should read --a binary--; and
Line 57, "output mean" should read --output means--.

COLUMN 10

Line 22, "the outline" should read --outline--; and
Line 46, "an binary" should read --a binary--.

COLUMN 11

Line 2, "data;" should read --data;
extraction means for extracting outline vector data based on the image data;--;
Line 4, "means;" should read --means based on the outline vector data extracted by said extraction means;--;
Line 5, "storing" should read --storing the outline vector data extracted by said extracting means and--;

UNITED STATES PATENT AND TRADEMARK OFFICE
CERTIFICATE OF CORRECTION

PATENT NO. : 5,515,179       Page 4 of 8
DATED      : May 7, 1996
INVENTOR(S): JUNICHI YAMAKAWA, ET AL.

It is certified that error appears in the above-indentified patent and that said Letters Patent is hereby corrected as shown below:

<u>COLUMN 11,</u>

Line 6, "means." should read --means, the position data having a form different from that of the outline vector data, so as to store the image data inputted by said input means as compressed data.--;

Lines 9 through 13, "generation means for generating vector data which represents outline vectors on the basis of the position data stored in said storage means, wherein the outline vectors represent a boundary of black pixels and white pixels; and" should be deleted;

Line 15, "the vector data generated by said generating" should read --the outline vector data and the position data stored in said storage--;

Line 17, "claim 25, wherein" should read --claim 25, further comprising:
   generation means for generating vector data which represents the outline vector data on the basis of the position data stored in said storage means, wherein the outline vector data represent boundary of black pixels and white pixels,
     wherein--;

Line 24, "a binary image" should read --the image data--;
Line 30, "vectors" should read --vector data--;

UNITED STATES PATENT AND TRADEMARK OFFICE
CERTIFICATE OF CORRECTION

PATENT NO. : 5,515,179
DATED : May 7, 1996
INVENTOR(S) : JUNICHI YAMAKAWA, ET AL.

It is certified that error appears in the above-indentified patent and that said Letters Patent is hereby corrected as shown below:

<u>COLUMN 11,</u>

Line 35, "claim 25, wherein" should read --claim 24, further comprising:
      generation means for generating vector data which represents the outline vector data on the basis of the position data stored in said storage means, wherein the outline vector data represent boundary of black pixels and white pixels,
      wherein--;

Line 39, "the data" should read --the position data--;

Line 43, "data;" should read --data;
      an extraction step for extracting outline vector data based on the image data;--;

Line 46, "input step;" should read --input step based on the outline vector data extracted in said extraction step;--;

Line 47, "storing" should read --storing the outline vector data extracted in said extraction step and--;

Line 48, "step." should read --step, the position data having a form different from that of the outline vector data so as to store the image data inputted in said input step as compressed data.--;

Lines 51 through 55 "a generation step for generating data which represents outline vectors on the basis of the position data stored in said storage step, wherein the outline vectors represent boundary of black pixels and white pixels; and" should be deleted;

Line 57, "vector data generated in said generating" should read --outline vector data and the position data stored in said storage--;

UNITED STATES PATENT AND TRADEMARK OFFICE
CERTIFICATE OF CORRECTION

| | | |
|---|---|---|
| PATENT NO. : | 5,515,179 | Page 6 of 8 |
| DATED : | May 7, 1996 | |
| INVENTOR(S) : | JUNICHI YAMAKAWA, ET AL. | |

It is certified that error appears in the above-indentified patent and that said Letters Patent is hereby corrected as shown below:

COLUMN 11,

Line 59, "claim 34, wherein" should read --claim 35, further comprising:
    a generation step for generating vector data which represents the outline vector data on the basis of the position data stored in said storage step, wherein the outline vector data represent boundary of black pixels and white pixels, and
    wherein--; and Line 60, "includes:" should read --includes--.

COLUMN 12

Line 1, "a binary image" should read --the image data--;
Line 4, "binary data" should read --image data--;
Line 6, "binary data" should read --image data--;
Line 9, "vectors" should read --vector data--;
Line 10, "staid" should read --said--;
Line 14, "claim 35, wherein said" should read --claim 34, further comprising:
    a generation step for generating vector data which represents the outline vector data on the basis of the position data stored in said storage step, wherein the outline vector data represent boundary of black pixels and white pixels, and wherein--;

Line 15, "generation step includes generating" should be deleted;

UNITED STATES PATENT AND TRADEMARK OFFICE
CERTIFICATE OF CORRECTION

PATENT NO. : 5,515,179
DATED : May 7, 1996
INVENTOR(S) : JUNICHI YAMAKAWA, ET AL.

It is certified that error appears in the above-indentified patent and that said Letters Patent is hereby corrected as shown below:

COLUMN 12,

Line 17, "vector." should read --vector is generated in said generation step.--;
Line 18, "the data" should read --the position data--;
Lines 36 through 38, "second generation means for generating the outline vectors which represent boundary pixels on the basis of the position data stored in said first storage means;" should be deleted;
Line 40, "reproducing a binary image by" should read --reproducing image data on the basis of the outline vector data,--;
Line 41, "using the outline vectors" should be deleted;
Line 42, "means and the outline vectors generated by said second" should read --means, and the position data, stored in said first storage--;
Line 43, "generation" should be deleted;
Line 44, "binary image" should read --image data--;
Lines 58 through 61, "first generation means for generating outline vectors which represent boundary of black pixels and white pixels by scanning the binary data received by said data obtaining means except the isolated pixels;" should be deleted; and
Line 63, "obtaining means;" should read:
--data obtaining means;
first generation means for generating outline vectors which represent boundary of black pixels and white pixels by scanning the binary data obtained by said data obtaining means except the isolated pixels;--.

UNITED STATES PATENT AND TRADEMARK OFFICE
CERTIFICATE OF CORRECTION

PATENT NO. : 5,515,179
DATED : May 7, 1996
INVENTOR(S) : JUNICHI YAMAKAWA, ET AL.

It is certified that error appears in the above-indentified patent and that said Letters Patent is hereby corrected as shown below:

COLUMN 13

Line 38, "image obtained" should read
--image data obtained--.

COLUMN 14

Line 11, "generating the" should read --generating--; and
Line 19, "; and" should read --;--.

Signed and Sealed this

Nineteenth Day of November, 1996

Attest:

BRUCE LEHMAN

Attesting Officer      Commissioner of Patents and Trademarks